(12) United States Patent
Lemmens et al.

(10) Patent No.: US 11,016,643 B2
(45) Date of Patent: May 25, 2021

(54) MOVEMENT OF USER INTERFACE OBJECT WITH USER-SPECIFIED CONTENT

(71) Applicant: Apple Inc., Cupertino, CA (US)

(72) Inventors: Cas Lemmens, San Francisco, CA (US); Christian Dalonzo, San Francisco, CA (US); Christopher Patrick Foss, San Francisco, CA (US); Pani Page, San Francisco, CA (US); Eric Lance Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/688,766

(22) Filed: Nov. 19, 2019

(65) Prior Publication Data
US 2020/0326834 A1 Oct. 15, 2020

Related U.S. Application Data

(60) Provisional application No. 62/834,354, filed on Apr. 15, 2019, provisional application No. 62/855,738, filed on May 31, 2019.

(51) Int. Cl.
G06F 3/048 (2013.01)
G06F 3/0484 (2013.01)
(Continued)

(52) U.S. Cl.
CPC ........ G06F 3/04845 (2013.01); G06F 3/0485 (2013.01); G06F 3/04883 (2013.01)

(58) Field of Classification Search
CPC ............... G06F 3/04883; G06F 3/0488; G06F 3/04845; G06F 3/0485
See application file for complete search history.

(56) References Cited

U.S. PATENT DOCUMENTS 5,353,391 A 10/1994 Cohen et al.
5,359,712 A 10/1994 Cohen et al.
(Continued)

FOREIGN PATENT DOCUMENTS

EP 0483777 A2 5/1992
JP 7-160428 A 6/1995
(Continued)

OTHER PUBLICATIONS

Online Learning (http://psychology230.tripod.com/canyons_online/id11.html, attached as pdf, 2008) (Year: 2008).*
(Continued)

Primary Examiner — Alex Olshannikov
(74) Attorney, Agent, or Firm — Dentons US LLP

(57) ABSTRACT

The present disclosure generally relates to interacting with user interface objects in a user interface. An input is detected directed to the user interface object that includes a respective amount of movement in a first direction. In response to detecting the input, if the user interface object includes user-specified content, then the user interface object is moved a first distance selected based on the respective amount of movement of the input in the first direction. If the user interface object does not include user-specified content, then the user interface object is moved a second distance selected based on the respective amount of movement of the input in the first direction, wherein the second distance is larger than the first distance.

39 Claims, 32 Drawing Sheets

(51) Int. Cl.
  *G06F 3/0485* (2013.01)
  *G06F 3/0488* (2013.01)

(56) References Cited

U.S. PATENT DOCUMENTS

| | | |
|---|---|---|
| 5,442,744 A | 8/1995 | Piech et al. |
| 5,473,746 A | 12/1995 | Pritt et al. |
| 5,475,812 A | 12/1995 | Corona et al. |
| 5,491,778 A | 2/1996 | Gordon et al. |
| 5,659,694 A | 8/1997 | Bibayan |
| 5,706,458 A | 1/1998 | Koppolu |
| 5,724,475 A | 3/1998 | Kirsten |
| 5,724,492 A | 3/1998 | Matthews et al. |
| 5,739,848 A | 4/1998 | Shimoura et al. |
| 5,745,710 A | 4/1998 | Clanto et al. |
| 5,745,910 A | 4/1998 | Piersol et al. |
| 5,754,179 A | 5/1998 | Hocker et al. |
| 5,760,773 A | 6/1998 | Berman et al. |
| 5,764,241 A | 6/1998 | Elliott et al. |
| 5,796,401 A | 8/1998 | Winer |
| 5,796,402 A | 8/1998 | Ellison-Taylor |
| 5,812,862 A | 9/1998 | Smith et al. |
| 5,838,318 A | 11/1998 | Porter et al. |
| 5,870,683 A | 2/1999 | Wells et al. |
| 5,880,733 A | 3/1999 | Horvitz et al. |
| 5,883,626 A | 3/1999 | Glaser et al. |
| 5,914,716 A | 6/1999 | Rubin et al. |
| 5,914,717 A | 6/1999 | Kleewein et al. |
| 5,920,316 A | 7/1999 | Oran et al. |
| 5,923,327 A | 7/1999 | Smith et al. |
| 5,999,173 A | 12/1999 | Ubillos |
| 6,002,402 A | 12/1999 | Schacher |
| 6,011,562 A | 1/2000 | Gagne |
| 6,020,887 A | 2/2000 | Loring et al. |
| 6,023,275 A | 2/2000 | Horvitz et al. |
| 6,043,817 A | 3/2000 | Bolnick et al. |
| 6,043,818 A | 3/2000 | Nakano et al. |
| 6,049,336 A | 4/2000 | Liu et al. |
| 6,057,833 A | 5/2000 | Heidmann et al. |
| 6,057,847 A | 5/2000 | Jenkins |
| 6,069,606 A | 5/2000 | Sciammarella et al. |
| 6,111,573 A | 8/2000 | McComb et al. |
| 6,115,051 A | 9/2000 | Simons et al. |
| 6,133,914 A | 10/2000 | Rogers et al. |
| 6,195,094 B1 | 2/2001 | Celebiler |
| 6,208,348 B1 | 3/2001 | Kaye |
| 6,208,360 B1 | 3/2001 | Doi et al. |
| 6,229,542 B1 | 5/2001 | Miller |
| 6,229,550 B1 | 5/2001 | Gloudemans et al. |
| 6,243,091 B1 | 6/2001 | Berstis |
| 6,297,819 B1 | 10/2001 | Furst |
| 6,353,451 B1 | 3/2002 | Teibel et al. |
| 6,384,869 B1 | 5/2002 | Sciammarella et al. |
| 6,396,520 B1 | 5/2002 | Ording |
| 6,407,757 B1 | 6/2002 | Ho |
| 6,414,684 B1 | 7/2002 | Mochizuki et al. |
| 6,462,754 B1 | 10/2002 | Chakraborty et al. |
| 6,466,237 B1 | 10/2002 | Miyao et al. |
| 6,486,895 B1 | 11/2002 | Robertson et al. |
| 6,512,522 B1 | 1/2003 | Miller et al. |
| 6,570,590 B1 | 5/2003 | Dubrow et al. |
| 6,590,577 B1 | 7/2003 | Yonts |
| 6,597,391 B2 | 7/2003 | Hudson |
| 6,608,631 B1 | 8/2003 | Milliron |
| 6,628,310 B1 | 9/2003 | Hiura et al. |
| 6,636,246 B1 | 10/2003 | Gallo et al. |
| 6,657,628 B1 | 12/2003 | Cook |
| 6,683,628 B1 | 1/2004 | Nakagawa et al. |
| 6,683,699 B1 | 1/2004 | Ashizaki et al. |
| 6,909,443 B1 | 6/2005 | Robertson et al. |
| 6,950,949 B1 | 9/2005 | Gilchrist |
| 6,957,395 B1 | 10/2005 | Jobs et al. |
| 6,970,749 B1 | 11/2005 | Chinn et al. |
| 6,976,210 B1 | 12/2005 | Silva et al. |
| 7,032,187 B2 | 4/2006 | Keely, Jr. et al. |
| 7,047,113 B1 | 5/2006 | Burch et al. |
| 7,071,943 B2 | 7/2006 | Adler |
| 7,196,702 B1 | 3/2007 | Lee et al. |
| 7,362,331 B2 | 4/2008 | Ording |
| 7,412,360 B2 | 8/2008 | Surazhsky et al. |
| 7,432,928 B2 | 10/2008 | Shaw et al. |
| 7,434,177 B1 | 10/2008 | Ording et al. |
| 7,453,464 B1 | 11/2008 | Acquavella |
| 7,487,467 B1 | 2/2009 | Kawahara et al. |
| 7,490,295 B2 | 2/2009 | Chaudhri et al. |
| 7,493,573 B2 | 2/2009 | Wagner |
| 7,506,268 B2 | 3/2009 | Jennings et al. |
| 7,512,898 B2 | 3/2009 | Jennings et al. |
| 7,526,738 B2 | 4/2009 | Ording et al. |
| 7,546,548 B2 | 6/2009 | Chew et al. |
| 7,546,554 B2 | 6/2009 | Chiu et al. |
| 7,561,874 B2 | 7/2009 | Wang et al. |
| 7,642,934 B2 | 1/2010 | Scott |
| 7,676,767 B2 | 3/2010 | Hofmeister et al. |
| 7,719,542 B1 | 5/2010 | Gough et al. |
| 7,747,289 B2 | 6/2010 | Wang et al. |
| 7,770,117 B1 | 8/2010 | Uy et al. |
| 7,782,324 B2 | 8/2010 | Goldfarb |
| 7,783,990 B2 | 8/2010 | Amadio et al. |
| 7,805,684 B2 | 9/2010 | Arvilommi |
| 7,853,972 B2 | 12/2010 | Brodersen et al. |
| 7,856,602 B2 | 12/2010 | Armstrong |
| 7,921,108 B2 | 4/2011 | Wang et al. |
| 8,127,239 B2 | 2/2012 | Louch et al. |
| 8,171,432 B2 | 5/2012 | Matas et al. |
| 8,564,544 B2 | 10/2013 | Jobs et al. |
| 8,972,890 B2 | 3/2015 | Ording |
| 9,244,606 B2 | 1/2016 | Kocienda et al. |
| 9,508,320 B2 | 11/2016 | Ording |
| 9,619,143 B2 | 4/2017 | Herz et al. |
| 9,927,970 B2 | 3/2018 | Ording et al. |
| 10,007,400 B2 | 6/2018 | Kocienda et al. |
| 2002/0000998 A1 | 1/2002 | Scott et al. |
| 2002/0010718 A1 | 1/2002 | Miller |
| 2002/0024540 A1 | 2/2002 | Mccarthy |
| 2002/0123368 A1 | 9/2002 | Yamadera et al. |
| 2003/0048295 A1 | 3/2003 | Lilleness et al. |
| 2003/0090572 A1 | 5/2003 | Belz et al. |
| 2003/0132938 A1 | 7/2003 | Shibao |
| 2003/0169298 A1 | 9/2003 | Ording |
| 2003/0184552 A1 | 10/2003 | Chadha |
| 2003/0206197 A1 | 11/2003 | Mcinerney |
| 2003/0225811 A1 | 12/2003 | Ali et al. |
| 2004/0012594 A1 | 1/2004 | Gauthier et al. |
| 2004/0117727 A1* | 6/2004 | Wada ............... G06F 1/1694 |
| | | 715/273 |
| 2004/0121823 A1 | 6/2004 | Noesgaard et al. |
| 2004/0155909 A1 | 8/2004 | Wagner |
| 2004/0181437 A1 | 9/2004 | Colman |
| 2004/0215719 A1 | 10/2004 | Altshuler |
| 2004/0222975 A1 | 11/2004 | Nakano et al. |
| 2004/0243306 A1 | 12/2004 | Han |
| 2005/0057548 A1 | 3/2005 | Kim |
| 2005/0060664 A1 | 3/2005 | Rogers |
| 2005/0097089 A1 | 5/2005 | Nielsen et al. |
| 2005/0108657 A1 | 5/2005 | Han |
| 2005/0138569 A1 | 6/2005 | Baxter et al. |
| 2005/0210369 A1 | 9/2005 | Damm |
| 2005/0210403 A1 | 9/2005 | Satanek |
| 2005/0253817 A1 | 11/2005 | Rytivaara et al. |
| 2005/0270311 A1 | 12/2005 | Rasmussen et al. |
| 2006/0025110 A1 | 2/2006 | Liu |
| 2006/0026536 A1 | 2/2006 | Hotelling et al. |
| 2006/0033724 A1 | 2/2006 | Chaudhri et al. |
| 2006/0051073 A1 | 3/2006 | Jung et al. |
| 2006/0123360 A1 | 6/2006 | Anwar et al. |
| 2006/0139328 A1 | 6/2006 | Maki et al. |
| 2006/0236266 A1 | 10/2006 | Majava |
| 2006/0242596 A1 | 10/2006 | Armstrong |
| 2006/0242607 A1 | 10/2006 | Hudson |
| 2006/0265653 A1 | 11/2006 | Paasonen et al. |
| 2006/0274070 A1 | 12/2006 | Herman et al. |
| 2006/0282786 A1 | 12/2006 | Shaw et al. |
| 2006/0290661 A1 | 12/2006 | Innanen et al. |

(56) References Cited

U.S. PATENT DOCUMENTS

| | | |
|---|---|---|
| 2007/0011150 A1 | 1/2007 | Frank |
| 2007/0028269 A1 | 2/2007 | Nezu et al. |
| 2007/0030362 A1 | 2/2007 | Ota et al. |
| 2007/0055947 A1 | 3/2007 | Ostojic et al. |
| 2007/0067272 A1 | 3/2007 | Flynt et al. |
| 2007/0083911 A1 | 4/2007 | Madden et al. |
| 2007/0101297 A1 | 5/2007 | Forstall et al. |
| 2007/0130153 A1 | 6/2007 | Nachman et al. |
| 2007/0157089 A1 | 7/2007 | Van os et al. |
| 2007/0162853 A1 | 7/2007 | Weber et al. |
| 2007/0180395 A1 | 8/2007 | Yamashita et al. |
| 2007/0189737 A1 | 8/2007 | Chaudhri et al. |
| 2007/0192741 A1 | 8/2007 | Yoritate et al. |
| 2007/0234235 A1 | 10/2007 | Scott |
| 2007/0240079 A1 | 10/2007 | Flynt et al. |
| 2007/0243862 A1 | 10/2007 | Coskun et al. |
| 2007/0245250 A1 | 10/2007 | Schechter et al. |
| 2007/0254722 A1 | 11/2007 | Kim et al. |
| 2007/0288862 A1 | 12/2007 | Ording |
| 2007/0296333 A1 | 12/2007 | Kim et al. |
| 2008/0001924 A1 | 1/2008 | de los reyes et al. |
| 2008/0005703 A1 | 1/2008 | Radivojevic et al. |
| 2008/0034309 A1 | 2/2008 | Louch et al. |
| 2008/0125180 A1 | 5/2008 | Hoffman et al. |
| 2008/0161045 A1 | 7/2008 | Vuorenmaa |
| 2008/0168401 A1 | 7/2008 | Boule et al. |
| 2008/0174562 A1 | 7/2008 | Kim |
| 2008/0182628 A1 | 7/2008 | Lee et al. |
| 2008/0184112 A1 | 7/2008 | Chiang et al. |
| 2008/0208456 A1 | 8/2008 | Jouline et al. |
| 2008/0216017 A1 | 9/2008 | Kurtenbach et al. |
| 2008/0218523 A1 | 9/2008 | Zuverink |
| 2008/0259045 A1 | 10/2008 | Kim et al. |
| 2008/0276280 A1 | 11/2008 | Nashida et al. |
| 2008/0297483 A1 | 12/2008 | Kim et al. |
| 2009/0002324 A1 | 1/2009 | Harbeson et al. |
| 2009/0006991 A1 | 1/2009 | Lindberg et al. |
| 2009/0007017 A1 | 1/2009 | Anzures et al. |
| 2009/0036108 A1 | 2/2009 | Cho |
| 2009/0199128 A1 | 8/2009 | Matthews et al. |
| 2009/0262091 A1* | 10/2009 | Ikeda ............... G06F 3/016 345/173 |
| 2009/0293007 A1 | 11/2009 | Duarte et al. |
| 2010/0088628 A1 | 4/2010 | Flygh et al. |
| 2010/0094531 A1 | 4/2010 | Macleod |
| 2010/0095238 A1 | 4/2010 | Baudet |
| 2010/0105454 A1 | 4/2010 | Weber et al. |
| 2010/0205567 A1 | 8/2010 | Haire et al. |
| 2010/0299597 A1 | 11/2010 | Shin et al. |
| 2010/0315345 A1* | 12/2010 | Laitinen ............ G06F 3/016 345/173 |
| 2011/0041086 A1 | 2/2011 | Kim et al. |
| 2011/0093889 A1 | 4/2011 | Araki et al. |
| 2011/0161856 A1 | 6/2011 | Nurmi et al. |
| 2011/0163970 A1 | 7/2011 | Lemay |
| 2011/0202872 A1 | 8/2011 | Park |
| 2011/0296333 A1 | 12/2011 | Bateman et al. |
| 2012/0017147 A1 | 1/2012 | Mark |
| 2012/0092346 A1 | 4/2012 | Ording et al. |
| 2012/0163574 A1* | 6/2012 | Gundotra ........... G06Q 50/01 379/114.03 |
| 2012/0221978 A1 | 8/2012 | Matas et al. |
| 2013/0019193 A1* | 1/2013 | Rhee ............... G06F 3/0486 715/769 |
| 2013/0069885 A1* | 3/2013 | Davidson .......... G06F 3/0488 345/173 |
| 2014/0340316 A1* | 11/2014 | Gu .................. G06F 3/041 345/173 |
| 2015/0160832 A1* | 6/2015 | Walkin ............ G06F 3/04883 715/765 |
| 2016/0139747 A1 | 5/2016 | Kocienda et al. |
| 2017/0060393 A1 | 3/2017 | Ording |
| 2017/0168651 A1* | 6/2017 | Ikeda ............... G06F 3/011 |
| 2017/0223176 A1 | 8/2017 | Anzures et al. |
| 2018/0275839 A1 | 9/2018 | Kocienda et al. |
| 2019/0302971 A1 | 10/2019 | Kocienda et al. |

FOREIGN PATENT DOCUMENTS

| | | |
|---|---|---|
| JP | 2002-62966 A | 2/2002 |
| JP | 2004-159028 A | 6/2004 |
| JP | 2005-309933 A | 11/2005 |
| WO | 2001/75574 A2 | 10/2001 |

OTHER PUBLICATIONS

Notice of Allowance received for U.S. Appl. No. 15/493,672, dated Apr. 14, 2020, 16 pages.

Pre-Interview First Office Action received for U.S. Appl. No. 16/378,990, dated Apr. 9, 2020, 5 pages.

Advisory Action received for U.S. Appl. No. 10/090,627, dated Aug. 19, 2014, 3 pages.

Advisory Action received for U.S. Appl. No. 10/090,627, dated Feb. 5, 2007, 3 pages.

Advisory Action received for U.S. Appl. No. 10/090,627, dated Jan. 29, 2009, 3 pages.

Advisory Action received for U.S. Appl. No. 10/090,627, dated Oct. 13, 2005, 3 pages.

Advisory Action received for U.S. Appl. No. 10/444,465, dated Jun. 19, 2007, 3 pages.

Advisory Action received for U.S. Appl. No. 12/217,029, dated Dec. 12, 2014, 3 pages.

Advisory Action received for U.S. Appl. No. 12/217,029, dated Dec. 14, 2016, 3 pages.

Advisory Action received for U.S. Appl. No. 13/077,524, dated May 16, 2014, 3 pages.

Advisory Action received for U.S. Appl. No. 15/351,298, dated Oct. 3, 2017, 6 pages.

Advisory Action received for U.S. Appl. No. 15/493,672, dated Aug. 12, 2019, 7 pages.

Advisory Action received for U.S. Appl. No. 10/444,465, dated Jun. 25, 2008, 3 pages.

Advisory Action received for U.S. Appl. No. 10/444,465, dated May 21, 2009, 3 pages.

Advisory Action received for U.S. Appl. No. 09/754,147, dated Aug. 27, 2003, 3 pages.

Av Bros., "Av Bros. Page Curl 2.0 for Windows and Mac OS X", User Guide, available at <http://c0002649.cdn2.cloudfiles.rackspacecloud.com/avpagecurl20.pdf>, 2004, 26 pages.

Chang et al., "Animation: from Cartoons to the User Interface", UIST '93 Proceedings of the 6th Annual ACM Symposium on User Interface Software and Technology, Nov. 1993, pp. 45-55.

Cline et al., "Window Closing Animations", IBM Technical Disclosure Bulletin, vol. 38, No. 11, Nov. 1995, 2 pages.

Decision to Grant received for European Application No. 02705704.1, dated Feb. 6, 2014, 2 pages.

Decision to Refuse received for European Patent Application No. 00986288.9, dated Jun. 12, 2006, 19 pages.

Decision to Refuse received for European Patent Application No. 09177507.2, dated Mar. 1, 2016, 5 pages.

Decision to Refuse received for European Patent Application No. 10011079.0, dated Mar. 1, 2016, 3 pages.

Extended European Search Report received for European Patent Application No. 10011079.0, dated Nov. 5, 2010, 7 pages.

Extended European Search Report received for European Patent Application No. 09177507.2, dated Jan. 27, 2010, 4 pages.

Final Office Action received for U.S. Appl. No. 09/754,147, dated Apr. 22, 2003, 10 pages.

Final Office Action received for U.S. Appl. No. 09/754,147, dated Dec. 22, 2006, 9 pages.

Final Office Action received for U.S. Appl. No. 11/892,154, dated Aug. 31, 2012, 10 pages.

Final Office Action received for U.S Appl. No. 11/892,154, dated Feb. 2, 2011, 9 pages.

Final Office Action received for U.S. Appl. No. 11/892,154, dated Sep. 27, 2013, 11 pages.

(56) References Cited

OTHER PUBLICATIONS

Final Office Action received for U.S. Appl. No. 13/461,635, dated Jan. 13, 2015, 27 pages.
Final Office Action received for U.S. Appl. No. 10/444,465, dated Apr. 1, 2008, 11 pages.
Final Office Action received for U.S. Appl. No. 10/444,465, dated Apr. 6, 2007, 10 pages.
Final Office Action received for U.S. Appl. No. 10/444,465, dated Mar. 2, 2009, 12 pages.
Final Office Action received for U.S. Appl. No. 10/090,627, dated Dec. 1, 2010, 13 pages.
Final Office Action received for U.S. Appl. No. 10/090,627, dated Feb. 16, 2012, 13 pages.
Final Office Action received for U.S. Appl. No. 10/090,627, dated Jan. 13, 2014, 13 pages.
Final Office Action received for U.S. Appl. No. 10/090,627, dated Jun. 15, 2005, 9 pages.
Final Office Action received for U.S. Appl. No. 10/090,627, dated May 14, 2012, 13 pages.
Final Office Action received for U.S. Appl. No. 10/090,627, dated Oct. 7, 2008, 10 pages.
Final Office Action received for U.S. Appl. No. 10/090,627, dated Oct. 19, 2006, 12 pages.
Final Office Action received for U.S. Appl. No. 10/090,627, dated Sep. 25, 2007, 10 pages.
Final Office Action received for U.S. Appl. No. 12/217,029, dated May 22, 2014, 12 pages.
Final Office Action received for U.S. Appl. No. 12/217,029, dated Oct. 5, 2012, 28 pages.
Final Office Action received for U.S. Appl. No. 13/077,524, dated Feb. 12, 2014, 13 pages.
Final Office Action received for U.S. Appl. No. 15/351,298, dated Jun. 29, 2017, 15 pages.
Final Office Action received for U.S. Appl. No. 15/351,298, dated Oct. 18, 2018, 15 pages.
Final Office Action received for U.S. Appl. No. 15/493,672, dated May 31, 2019, 25 pages.
Final Office Acton received for U.S. Appl. No. 11/892,154, dated May 8, 2015, 11 pages.
Gralla, "Google™ Search and Tools in a Snap", Sams, Apr. 4, 2006, pp. 1-3.
Holthe et al., "Video Browsing Techniques for Web Interfaces", available at <http://ieeexplore.ieee.org/Xplore/login.jsp?url=http%3A%2F%2Fieeexplore.ieee.org%2Fstamp.jsp%3Farnumber%3D01593233&authDecision=-203>, 2005, 5 pages.
Intention to Grant received for European Application No. 02705704.1, dated Sep. 30, 2013, 7 pages.
International Preliminary Examination Report received for PCT Application No. PCT/US2000/033275, completed on Jan. 15, 2002, 3 pages.
International Preliminary Examination Report received for PCT Application No. PCT/US2002/000465, Completed on May 15, 2003, 2 pages.
International Search Report received for PCT Application No. PCT/US2000/033275, dated Apr. 5, 2001, 1 Page.
International Search Report received for PCT Application No. PCT/US2002/000465, dated Feb. 6, 2003, 3 pages.
Liu et al., "Expressive Expression Mapping with Ratio Images", available online at:—https://www.microsoft.com/en-us/research/wp-content/uploads/2016/11/Expression-Mapping.pdf, 2001, pp. 271-276.
Mobilissimo.ro, "HTC Touch—Touch Flo Demo", Online Available at: <<https://www.youtube.com/watch?v=YQ8TD9Rr_7E>, Jun. 5, 2007, 1 page.
Non-Final Office Action received for U.S. Appl. No. 10/444,465, dated Aug. 19, 2009, 12 pages.
Non-Final Office Action received for U.S. Appl. No. 10/444,465, dated Oct. 11, 2006, 11 pages.
Non-Final Office Action received for U.S. Appl. No. 09/754,147, dated Jan. 30, 2004, 6 pages.
Non-Final Office Action received for U.S. Appl. No. 09/754,147, dated Jul. 17, 2006, 9 pages.
Non-Final Office Action received for U.S. Appl. No. 09/754,147, dated Nov. 20, 2002, 8 pages.
Non-Final Office Action received for U.S. Appl. No. 10/444,465, dated Sep. 18, 2008, 11 pages.
Non-Final Office Action received for U.S. Appl. No. 10/444,465, dated Sep. 20, 2007, 10 pages.
Non-Final Office Action received for U.S. Appl. No. 11/892,154, dated Aug. 18, 2010, 10 pages.
Non-Final Office Action received for U.S. Appl. No. 11/892,154, dated Dec. 9, 2015, 11 pages.
Non-Final Office Action received for U.S. Appl. No. 11/892,154, dated Jan. 5, 2012, 10 pages.
Non-Final Office Action received for U.S. Appl. No. 11/892,154, dated Jun. 5, 2013, 9 pages.
Non-Final Office Action received for U.S. Appl. No. 11/892,154, dated Aug. 14, 2014, 8 pages.
Non-Final Office Action received for U.S. Appl. No. 15/351,298, dated Jan. 27, 2017, 18 pages.
Non-Final Office Action received for U.S. Appl. No. 15/351,298, dated Mar. 8, 2018, 15 pages.
Non-Final Office Action received for U.S. Appl. No. 13/461,635, dated Jul. 31, 2014, 34 pages.
Non-Final Office Action received for U.S. Appl. No. 13/461,635, dated Feb. 14, 2014, 32 pages.
Non-Final Office Action received for U.S. Appl. No. 12/143,741, dated Jan. 25, 2011, 18 pages.
Non-Final Office Action received for U.S. Appl. No. 12/217,029, dated Apr. 18, 2011, 26 pages.
Non-Final Office Action received for U.S. Appl. No. 12/217,029, dated Aug. 19, 2013, 10 pages.
Non-Final Office Action received for U.S. Appl. No. 12/217,029, dated Jan. 25, 2012, 20 pages.
Non-Final Office Action received for U.S. Appl. No. 12/217,029, dated Oct. 28, 2015, 23 pages.
Non-Final Office Action received for U.S. Appl. No. 13/077,524, dated Jun. 28, 2013, 17 pages.
Non-Final Office Action received for U.S. Appl. No. 15/004,189, dated Dec. 21, 2017, 8 pages.
Non-Final Office Action received for U.S. Appl. No. 15/493,672, dated Nov. 6, 2018, 21 pages.
Non-Final Office Action received for U.S. Appl. No. 15/990,076, dated Aug. 13, 2018, 6 pages.
Non-Final Office Action received for U.S. Appl. No. 10/090,627, dated Apr. 4, 2011, 15 pages.
Non-Final Office Action received for U.S. Appl. No. 10/090,627, dated Apr. 20, 2006, 7 pages.
Non-Final Office Action received for U.S. Appl. No. 10/090,627, dated Jun. 20, 2013, 13 pages.
Non-Final Office Action received for U.S. Appl. No. 10/090,627, dated Jun. 24, 2009, 14 pages.
Non-Final Office Action received for U.S. Appl. No. 10/090,627, dated Mar. 15, 2010, 12 pages.
Non-Final Office Action received for U.S. Appl. No. 10/090,627, dated Mar. 21, 2008, 10 pages.
Non-Final Office Action received for U.S. Appl. No. 10/090,627, dated Mar. 23, 2007, 8 pages.
Non-Final Office Action received for U.S. Appl. No. 10/090,627, dated Oct. 6, 2004, 8 pages.
Notice of Allowance received for U.S. Appl. No. 13/077,524, dated Sep. 15, 2015, 9 pages.
Notice of Allowance received for U.S. Appl. No. 10/090,627, dated Oct. 22, 2014, 7 pages.
Notice of Allowance received for U.S. Appl. No. 12/143,741, dated Dec. 30, 2011, 5 pages.
Notice of Allowance received for U.S. Appl. No. 12/143,741, dated Jul. 12, 2011, 5 pages.
Notice of Allowance received for U.S. Appl. No. 12/217,029, dated Jan. 17, 2017, 10 pages.
Notice of Allowance received for U.S. Appl. No. 13/077,524, dated May 27, 2015, 7 pages.

(56) References Cited

OTHER PUBLICATIONS

Notice of Allowance received for U.S. Appl. No. 15/004,189, dated Feb. 26, 2018, 7 pages.
Notice of Allowance received for U.S. Appl. No. 15/990,076, dated Dec. 12, 2018, 5 pages.
Notice of Allowance received for U.S. Appl. No. 15/990,076, dated Jan. 17, 2019, 8 pages.
Notice of Allowance received for U.S. Appl. No. 15/990,076, dated Nov. 8, 2018, 8 pages.
Notice of Allowance received for U.S. Appl. No. 09/477,738, dated Feb. 11, 2002, 7 pages.
Notice of Allowance received for U.S. Appl. No. 09/754,147, dated May 18, 2007, 6 pages.
Notice of Allowance received for U.S. Appl. No. 10/444,465, dated Mar. 25, 2010, 11 pages.
Notice of Allowance received for U.S. Appl. No. 11/892,154, dated Aug. 11, 2016, 14 pages.
Notice of Allowance received for U.S. Appl. No. 12/143,741, dated Sep. 16, 2011, 2 pages.
Office Action received for European Application No. 02705704.1, dated Apr. 1, 2011, 5 pages.
Office Action received for European Application No. 02705704.1, dated Oct. 11, 2007, 3 pages.
Office Action received for European Application No. 09177507.2, dated Sep. 24, 2010, 1 page.
Office Action received for European Application No. 09177507.2 dated May 7, 2012, 5 pages.
Office Action received for European Application No. 10011079.0, dated May. 7, 2012, 6 pages.
Office Action received for European Patent Application No. 00986288.9, dated Feb. 15, 2005, 4 pages.
Pighin et al., "Synthesizing Realistic Facial Expression from Photographs", available online at:—http://grail.cs.washington.edu/projects/realface/realface.pdf, 1998, pp. 1-10.
Pixelwit, "Page Flip", available at <http://web.archive.org/web/20070419035158/http://www.pixelwit.com/blog/page-flip/>, Apr. 11, 2007, pp. 1-6.
Realnetworks, "Transition Effects", RealNetworks Production Guide, Available at: <http://service.real.com/help/library/guides/productionguidepreview/HTML/htmflles/transit.htm>, 2001, pp. 1-21.
Seitz et al., "View Morphing", available online at: http://dl.acm.org/citation.cfm?id=237196, 1996, pp. 21-30.
Summons to Attend Oral Proceedings received for European Application No. 00986288.9, mailed on Jan. 27, 2006, 9 pages.
Summons to Attend Oral Proceedings received for European Application No. 09177507.2, mailed on Sep. 15, 2015, 12 pages.
Summons to Attend Oral Proceedings received for European Application No. 10011079.0, mailed on Sep. 16, 2015, 13 pages.
Summons to Oral Proceedings received for European Patent Application No. 00986288.9, mailed on Jun. 18, 2009, 10 pages.
Non-Final Office Action received for U.S. Appl. No. 15/493,672, dated Dec. 12, 2019, 32 pages.
Applicant-Initiated Interview Summary received for U.S. Appl. No. 15/493,672, dated Jan. 31, 2020, 5 pages.
OS/2: Contextual Animated-Open Window Control, IBM Technical disclosure bulletin, vol. 34, No. 11, Apr. 1992, pp. 68-69.
Corrected Notice of Allowance received for U.S. Appl. No. 16/378,990, dated Sep. 10, 2020, 5 pages.
Notice of Allowance received for U.S. Appl. No. 16/378,990, dated Aug. 11, 2020, 8 pages.
Applicant-Initiated Interview Summary received for U.S. Appl. No. 16/378,990, dated Jun. 22, 2020, 3 pages.

* cited by examiner

800

802
Displaying, via the touch-sensitive display device, a user interface object in a user interface

804
Detecting, via the touch-sensitive display device, an input directed to the user interface object that includes a respective amount of movement in a first direction

806
In response to detecting the input:

808
In accordance with a determination that the user interface object includes user-specified content:

810
Moving the user interface object a first distance selected based on the respective amount of movement of the input in the first direction;

812
In accordance with a determination that the user interface object does not include user-specified content:

814
Moving the user interface object a second distance selected based on the respective amount of movement of the input in the first direction, wherein the second distance is larger than the first distance

*FIG. 8*

MOVEMENT OF USER INTERFACE OBJECT WITH USER-SPECIFIED CONTENT

CROSS-REFERENCE TO RELATED APPLICATIONS

This application claims priority to U.S. provisional application No. 62/834,354, filed Apr. 15, 2019, titled "VARIABLE RESISTANCE TO USER INTERFACE DISMISSAL GESTURE" and U.S. provisional application No. 62/855,738, filed May 31, 2019, titled "MOVEMENT OF USER INTERFACE OBJECT WITH USER-SPECIFIED CONTENT", the contents of which are hereby incorporated by reference in their entireties.

FIELD

The present disclosure relates generally to computer user interfaces, and more specifically to techniques for interacting with a user interface object in a user interface.

BACKGROUND

Users are increasingly using electronic devices to view and interact with different user interfaces. Many user interfaces allow a user to enter information, such as text, into the user interface, where the entered information is then displayed.

BRIEF SUMMARY

Some techniques for interacting with user interfaces using electronic devices, however, are generally cumbersome and inefficient. For example, some existing techniques do not indicate to a user when information entered into the user interface will be discarded without the information being saved. When entered information is unknowingly discarded, a user may have to re-enter the information, which requires more time than necessary, wasting user time and device energy. This latter consideration is particularly important in battery-operated devices.

Accordingly, the present technique provides electronic devices with faster, more efficient methods and interfaces for interacting with user interface objects in a user interface. Such methods and interfaces optionally complement or replace other methods for interacting with user interfaces. Such methods and interfaces reduce the cognitive burden on a user and produce a more efficient human-machine interface. For battery-operated computing devices, such methods and interfaces conserve power and increase the time between battery charges.

In some embodiments, a method is performed at an electronic device with a touch-sensitive display device. The method includes: displaying, via the touch-sensitive display device, a user interface object in a user interface; detecting, via the touch-sensitive display device, an input directed to the user interface object that includes a respective amount of movement in a first direction; in response to detecting the input: in accordance with a determination that the user interface object includes user-specified content: moving the user interface object a first distance selected based on the respective amount of movement of the input in the first direction; in accordance with a determination that the user interface object does not include user-specified content: moving the user interface object a second distance selected based on the respective amount of movement of the input in the first direction, wherein the second distance is larger than the first distance.

In some embodiments, a non-transitory computer-readable storage medium stores one or more programs configured to be executed by one or more processors of an electronic device with a touch-sensitive display device. The one or more programs include instructions for: displaying, via the touch-sensitive display device, a user interface object in a user interface; detecting, via the touch-sensitive display device, an input directed to the user interface object that includes a respective amount of movement in a first direction; in response to detecting the input: in accordance with a determination that the user interface object includes user-specified content: moving the user interface object a first distance selected based on the respective amount of movement of the input in the first direction; in accordance with a determination that the user interface object does not include user-specified content: moving the user interface object a second distance selected based on the respective amount of movement of the input in the first direction, wherein the second distance is larger than the first distance.

In some embodiments, a transitory computer-readable storage medium stores one or more programs configured to be executed by one or more processors of an electronic device with a touch-sensitive display device. The one or more programs include instructions for: displaying, via the touch-sensitive display device, a user interface object in a user interface; detecting, via the touch-sensitive display device, an input directed to the user interface object that includes a respective amount of movement in a first direction; in response to detecting the input: in accordance with a determination that the user interface object includes user-specified content: moving the user interface object a first distance selected based on the respective amount of movement of the input in the first direction; in accordance with a determination that the user interface object does not include user-specified content: moving the user interface object a second distance selected based on the respective amount of movement of the input in the first direction, wherein the second distance is larger than the first distance.

In some embodiments, an electronic device includes a touch-sensitive display device, one or more processors, and memory. The memory stores one or more programs configured to be executed by the one or more processors. The one or more programs include instructions for: displaying, via the touch-sensitive display device, a user interface object in a user interface; detecting, via the touch-sensitive display device, an input directed to the user interface object that includes a respective amount of movement in a first direction; in response to detecting the input: in accordance with a determination that the user interface object includes user-specified content: moving the user interface object a first distance selected based on the respective amount of movement of the input in the first direction; in accordance with a determination that the user interface object does not include user-specified content: moving the user interface object a second distance selected based on the respective amount of movement of the input in the first direction, wherein the second distance is larger than the first distance.

In some embodiments, an electronic device includes a touch-sensitive display device, means for displaying, via the touch-sensitive display device, a user interface object in a user interface; means for detecting, via the touch-sensitive display device, an input directed to the user interface object that includes a respective amount of movement in a first direction; means for, in response to detecting the input: in accordance with a determination that the user interface object includes user-specified content: moving the user interface object a first distance selected based on the respective amount of movement of the input in the first direction; in accordance with a determination that the user interface object does not include user-specified content: moving the user interface object a second distance selected based on the respective amount of movement of the input in the first direction, wherein the second distance is larger than the first distance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for interacting with user interface objects in user interfaces, thereby increasing the effectiveness, efficiency, and user satisfaction with such devices. Such methods and interfaces may complement or replace other methods for interacting with user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 8 is a flow diagram illustrating a method for interacting with UI objects using an electronic device in accordance with some embodiments.

DESCRIPTION OF EMBODIMENTS

Figure 1A:
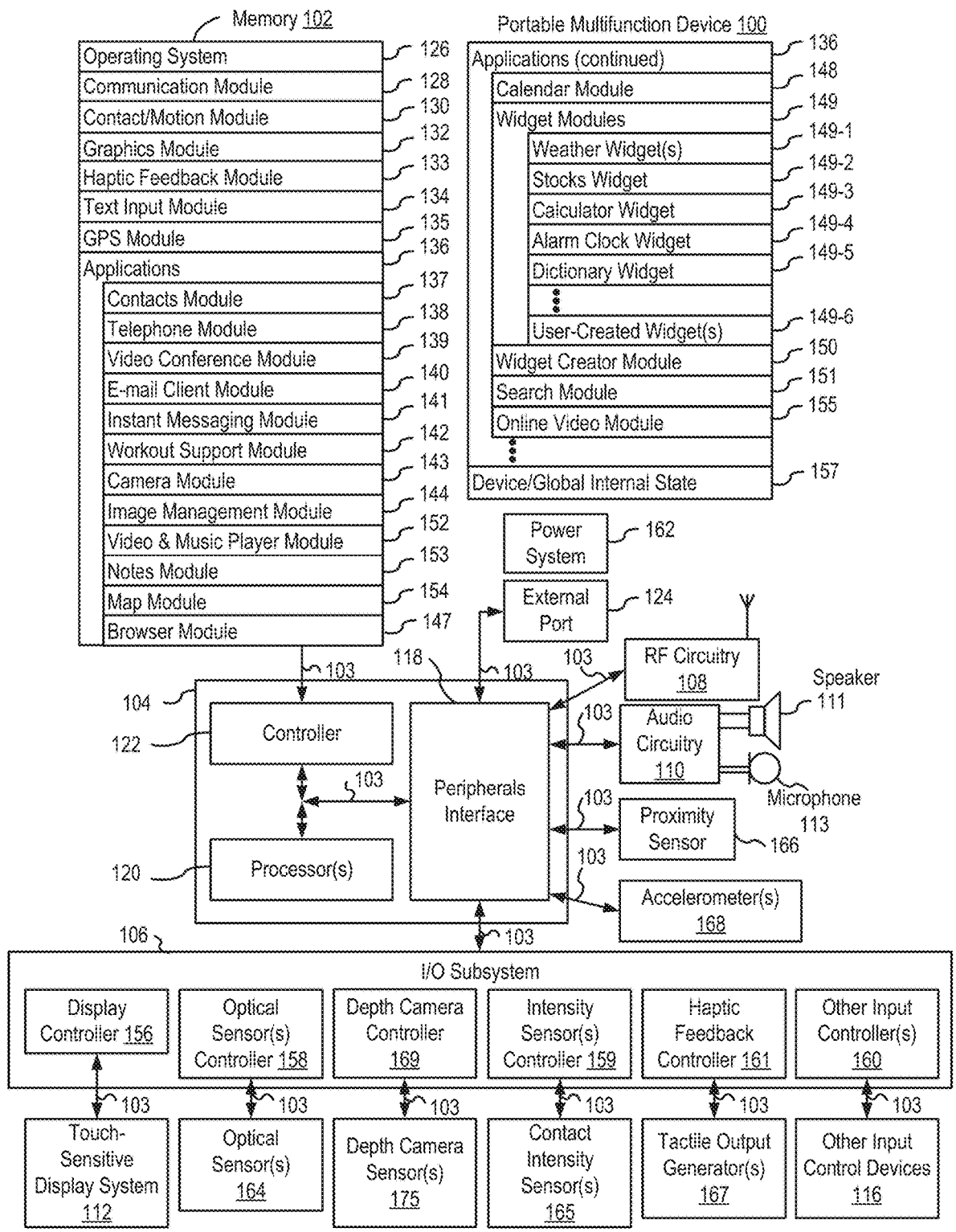
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient techniques for interacting with user interface (UI) objects in a user interface. Such techniques can reduce the cognitive burden on a user by indicating to the user during an interaction that the user interface object includes user-specified content, thereby enhancing productivity. Further, such techniques can reduce processor and battery power otherwise wasted on redundant user inputs. For example, the present techniques allow a user to quickly and efficiently dismiss a UI object and may prevent a user from unknowingly discarding user-specified content that is included in a UI object.

Below, FIGS. 1A-1B, 2, 3, 4A-4B, and 5A-5B provide a description of exemplary devices for performing the techniques for managing event notifications. FIGS. 6A-6O and FIGS. 7A-7H illustrate exemplary user interfaces for interacting with UI objects. FIG. 8 is a flow diagram illustrating methods of interacting with UI objects in accordance with some embodiments. The user interfaces in FIGS. 6A-6O and FIGS. 7A-7H are used to illustrate the processes described below, including the processes in FIG. 8.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click,"

"roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable, Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive resistive infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. Nos. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
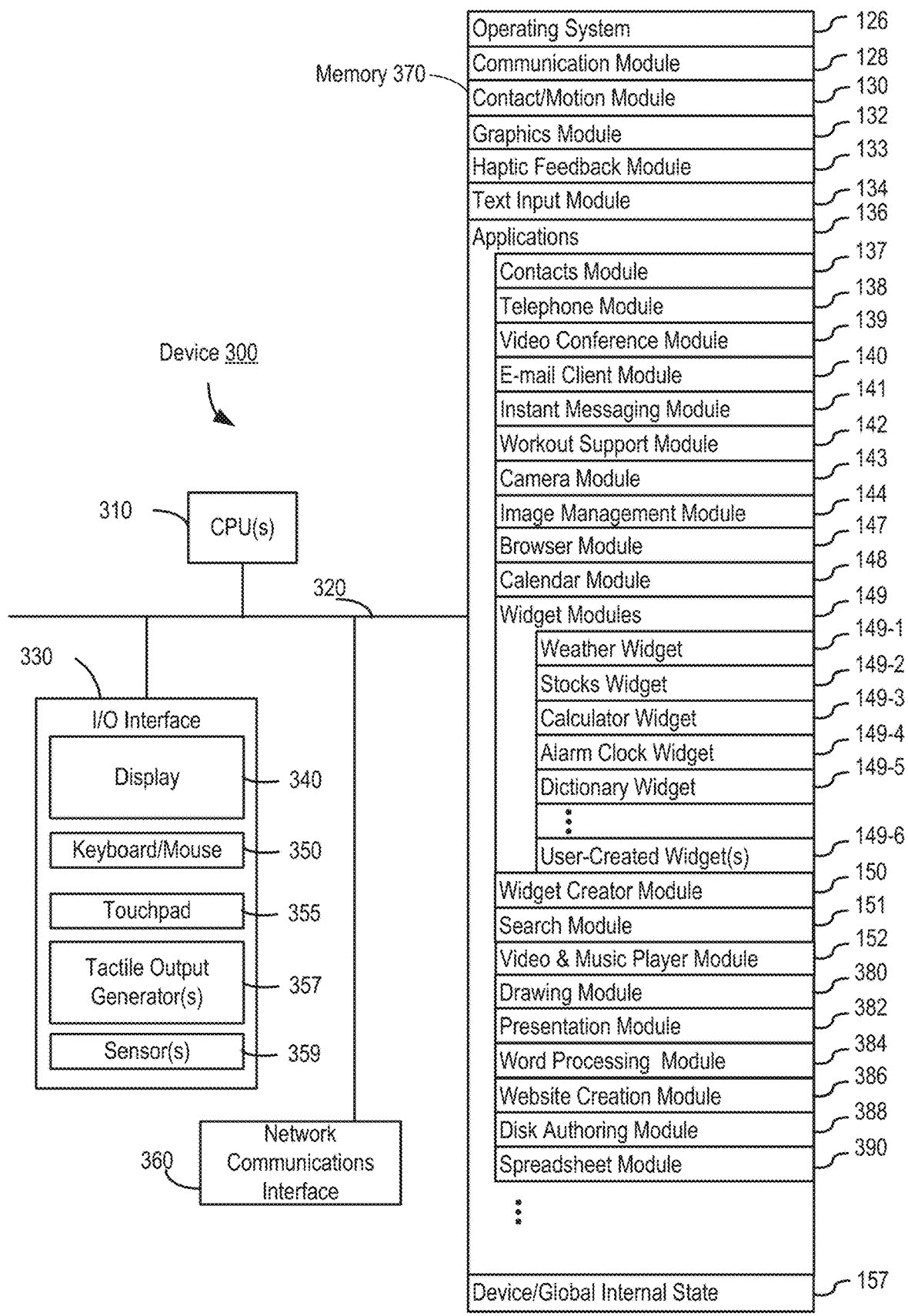
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140,
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132 and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
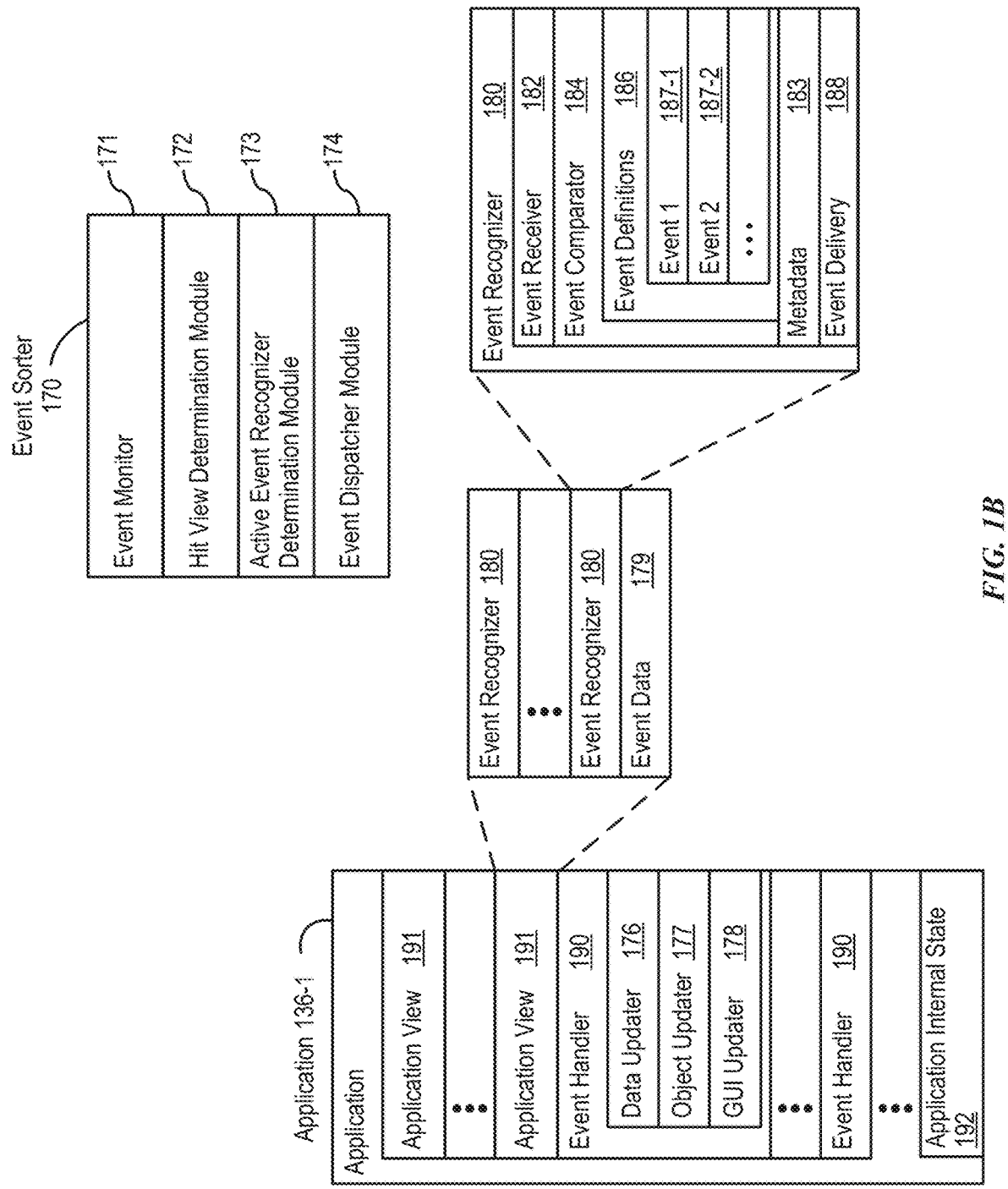
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
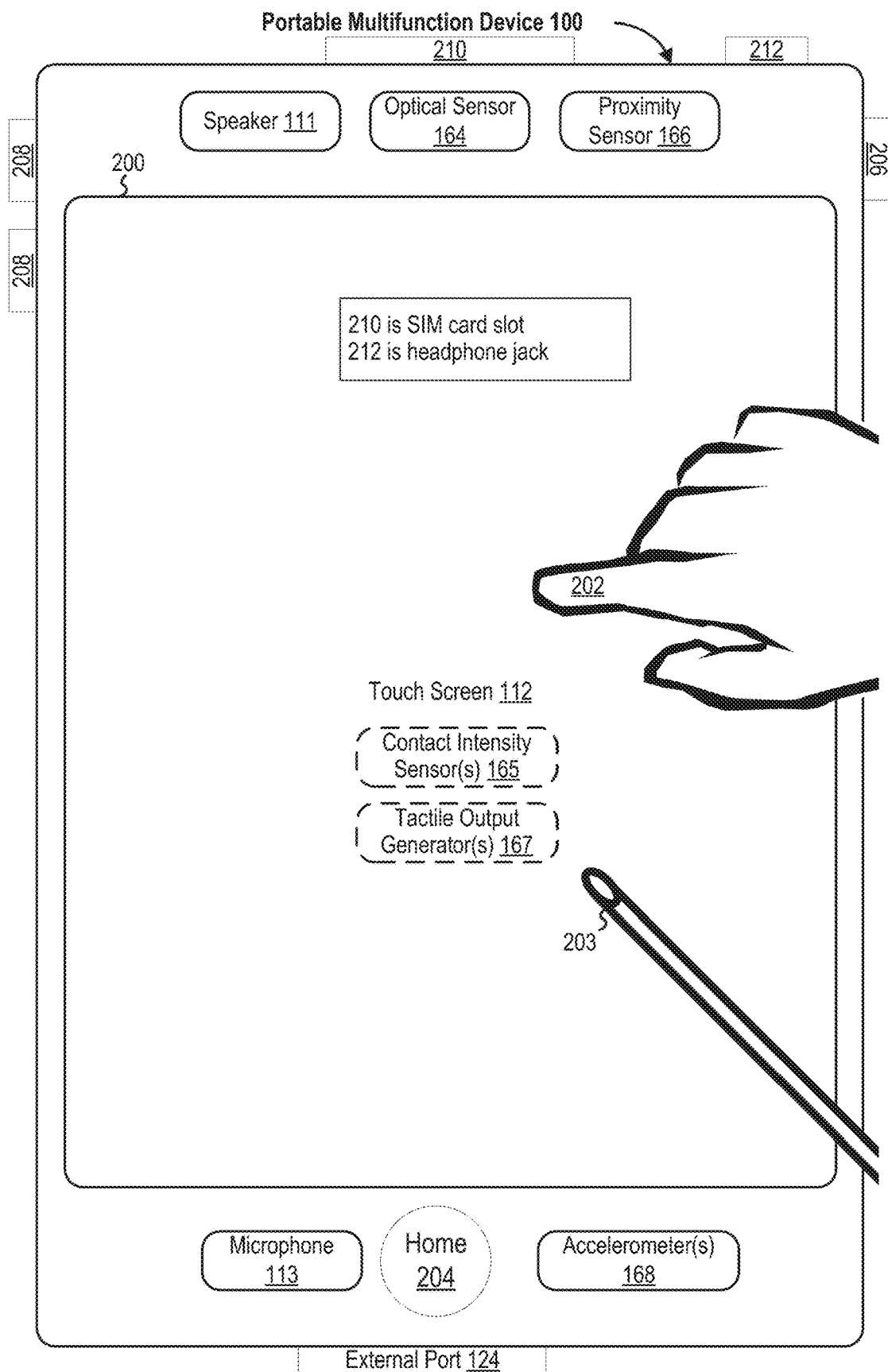
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
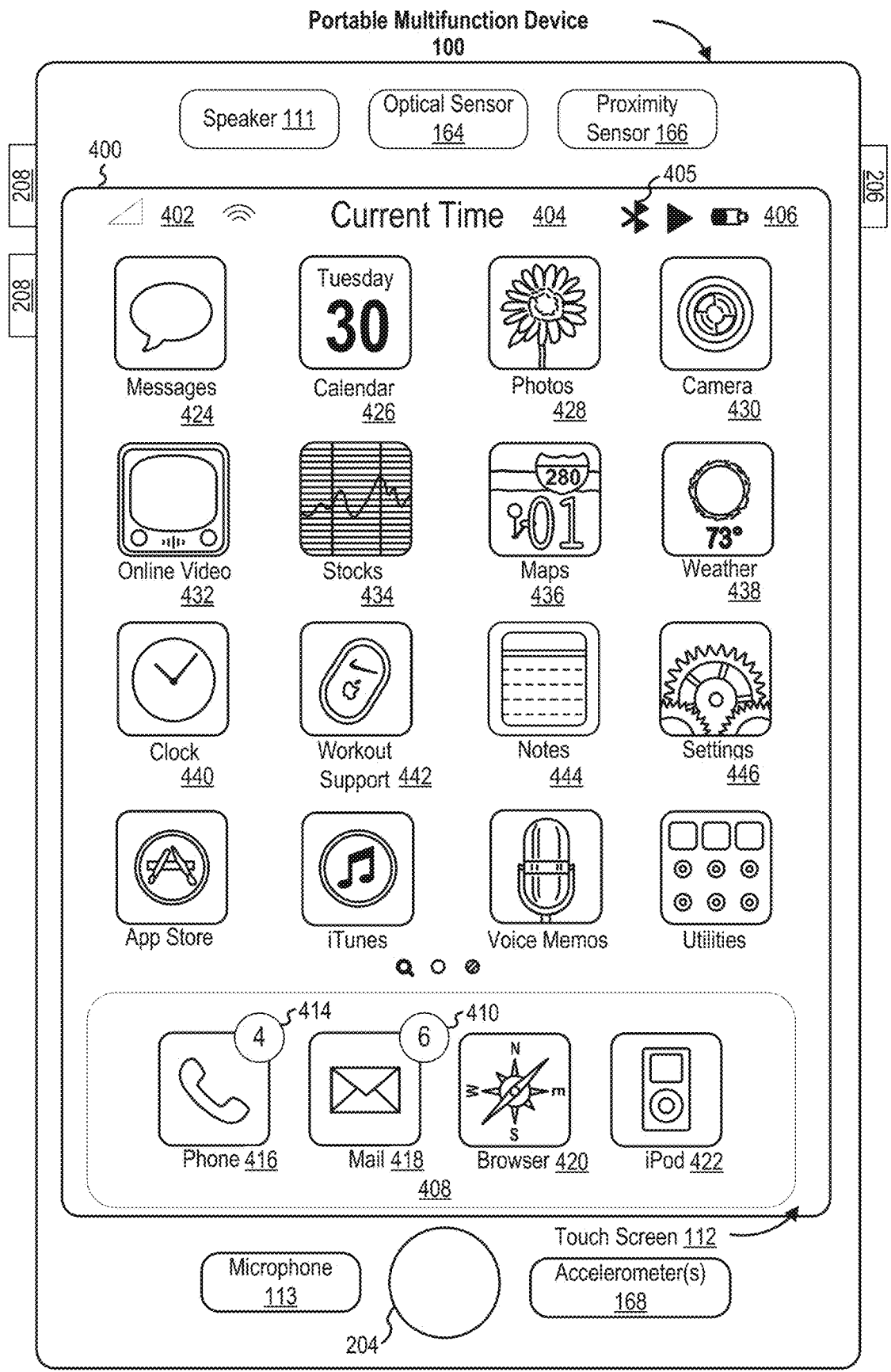
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar,"
  Icon 428 for image management module 144, labeled "Photos;"
  Icon 430 for camera module 143, labeled "Camera;"
  Icon 432 for online video module 155, labeled "Online video;"
  Icon 434 for stocks widget 149-2, labeled "Stocks,"
  Icon 436 for map module 154, labeled "Maps,"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
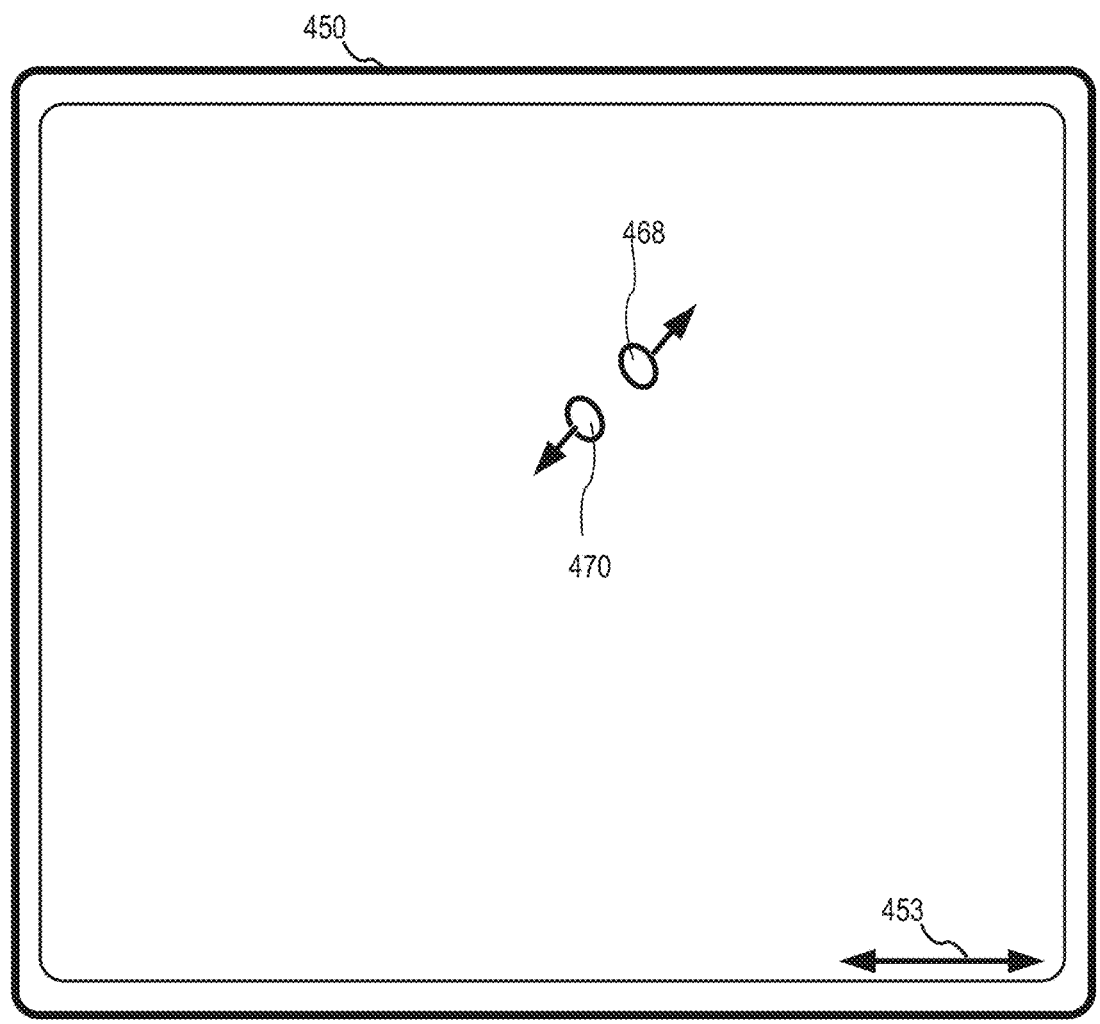
FIG. 4B illustrates an exemplary user interface for a multifunction device with a touch-sensitive surface that is separate from the display in accordance with some embodiments.
Figure 4B:
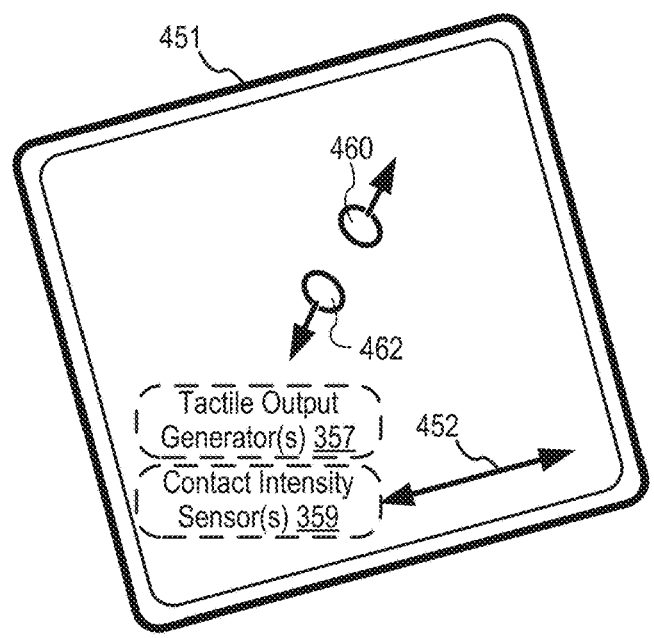

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
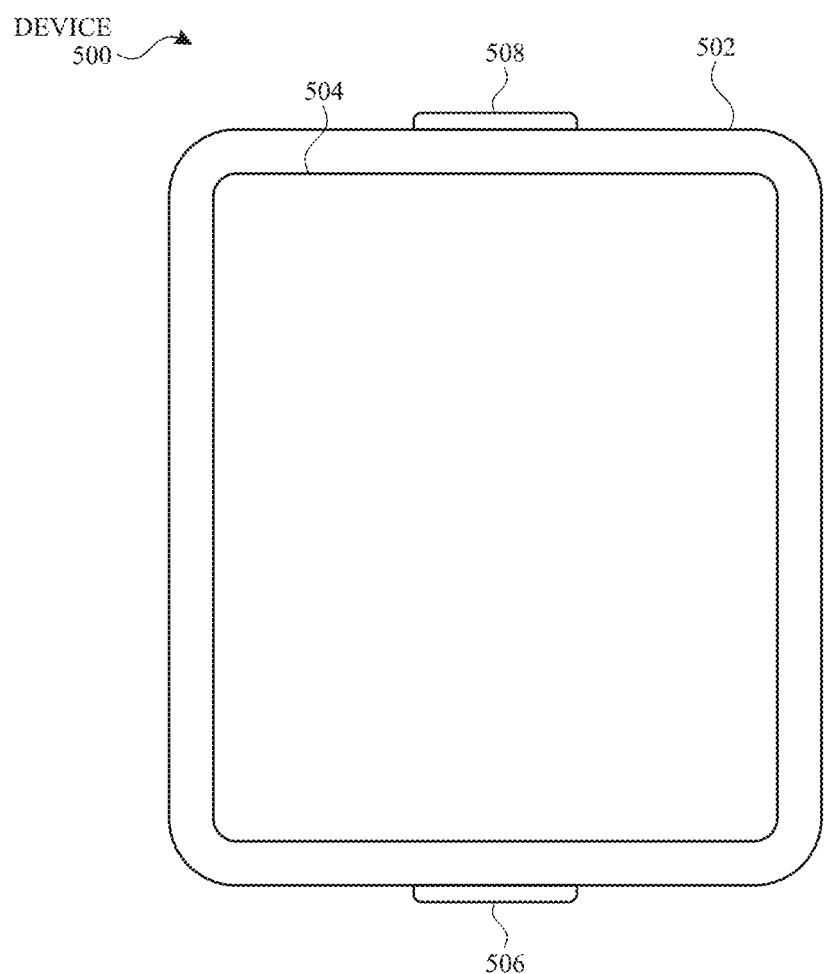
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
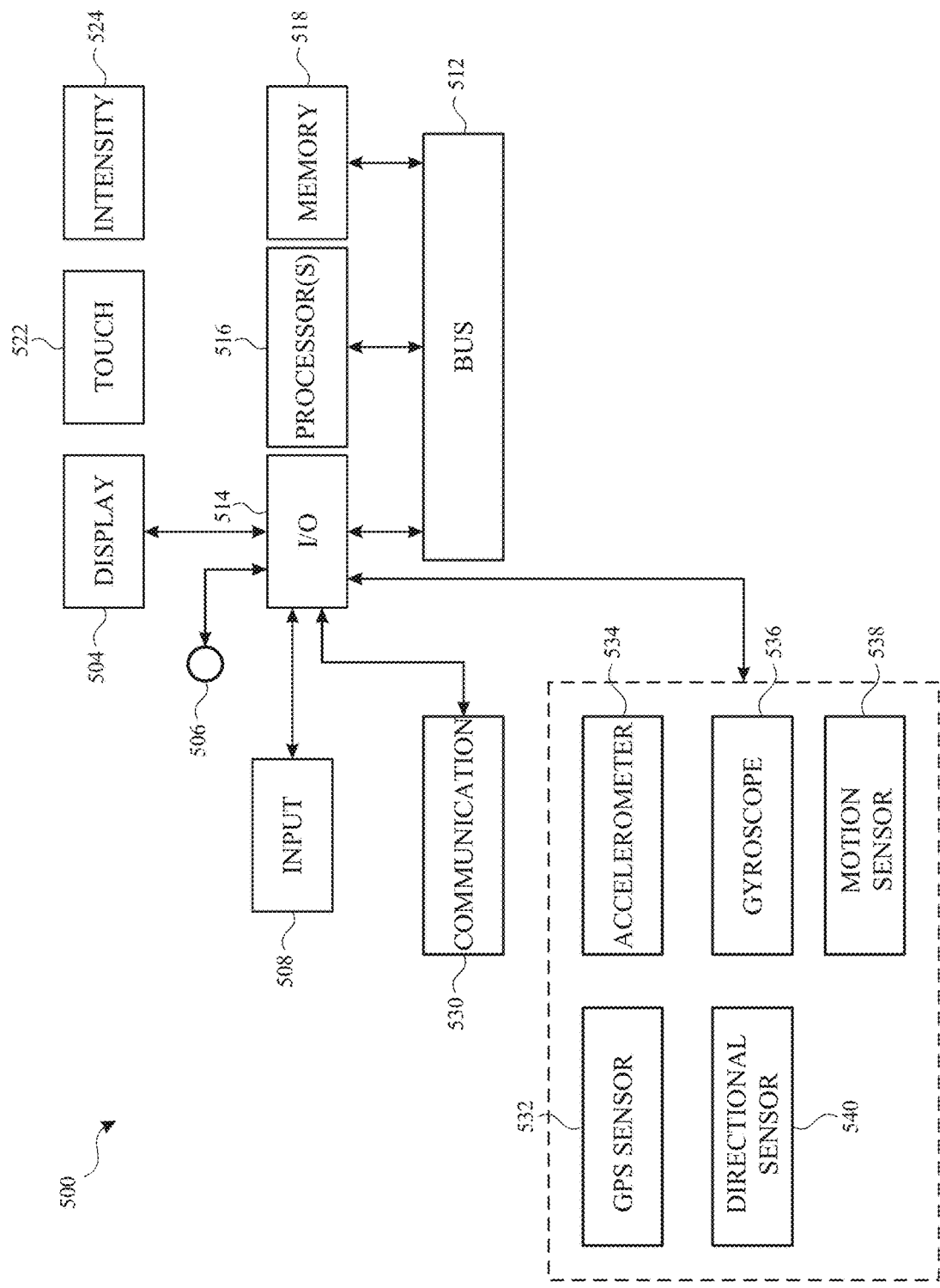
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using WiFi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 800 (FIG. 8) A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

Figure 6A:
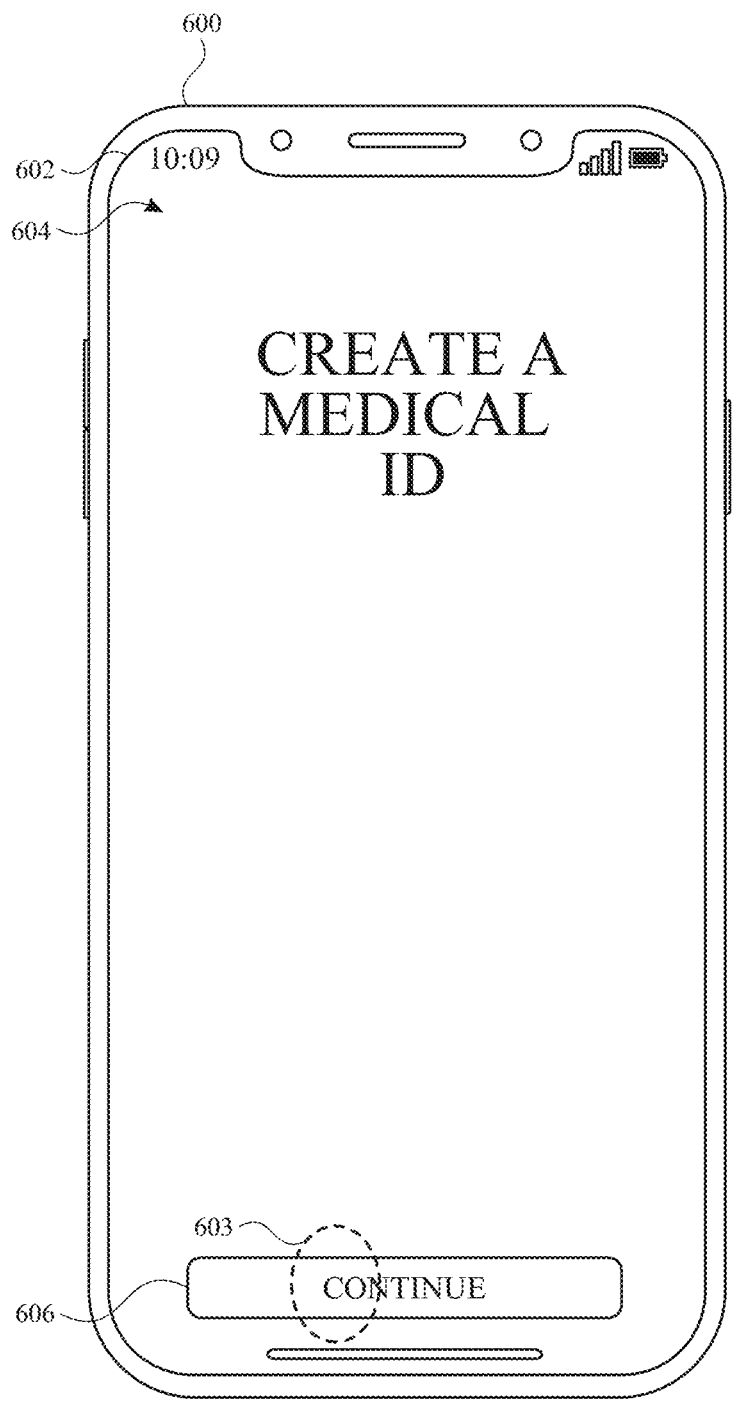
FIGS. 6A-6O illustrate exemplary user interfaces for interacting with UI objects in accordance with some embodiments.
Figure 6B:
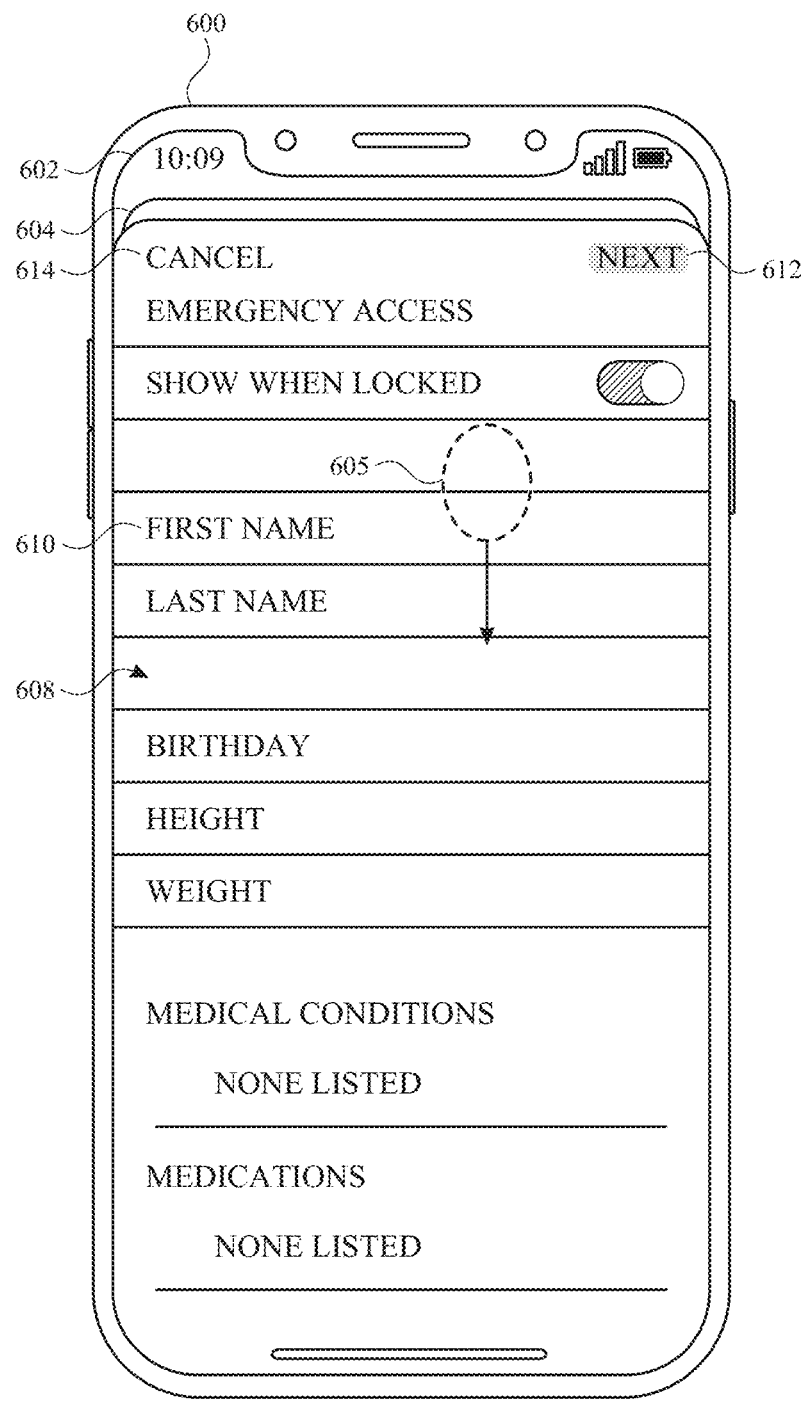
Figure 6C:
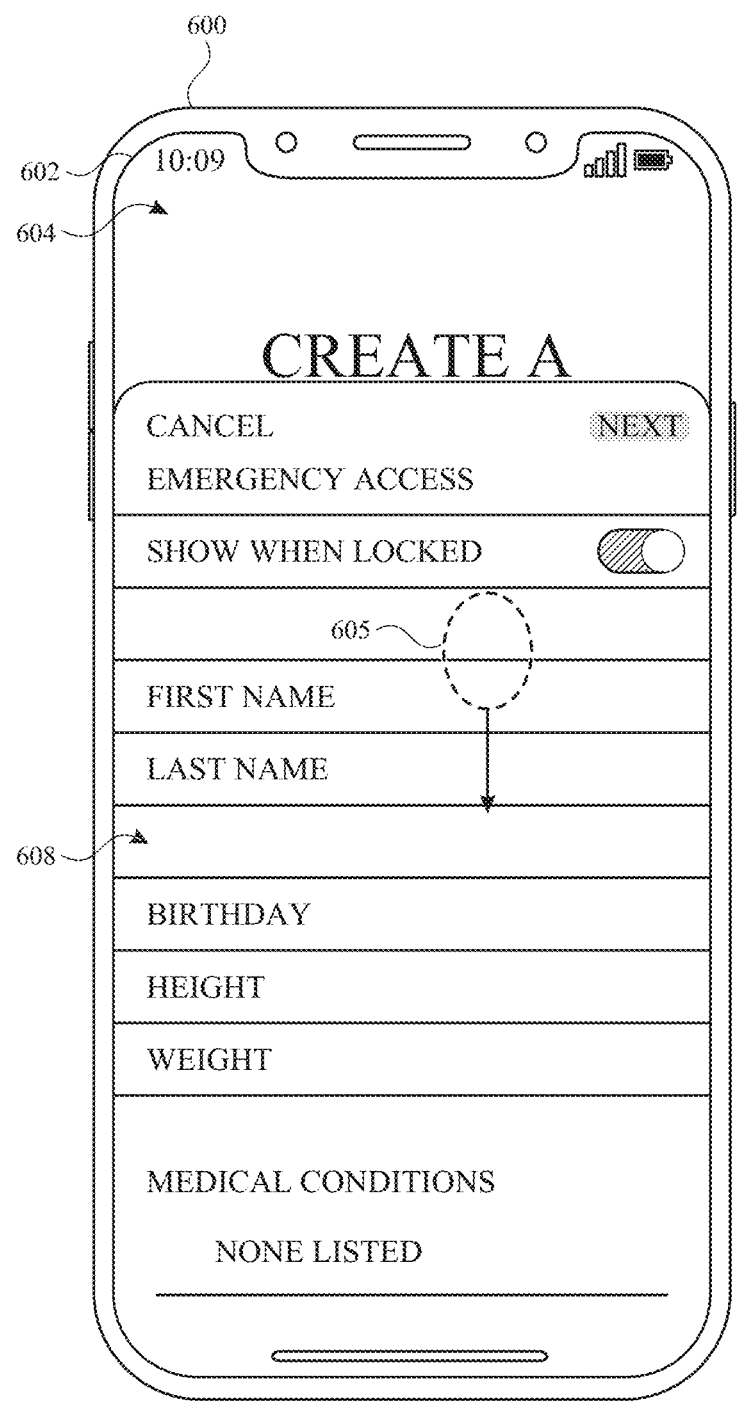
Figure 6D:
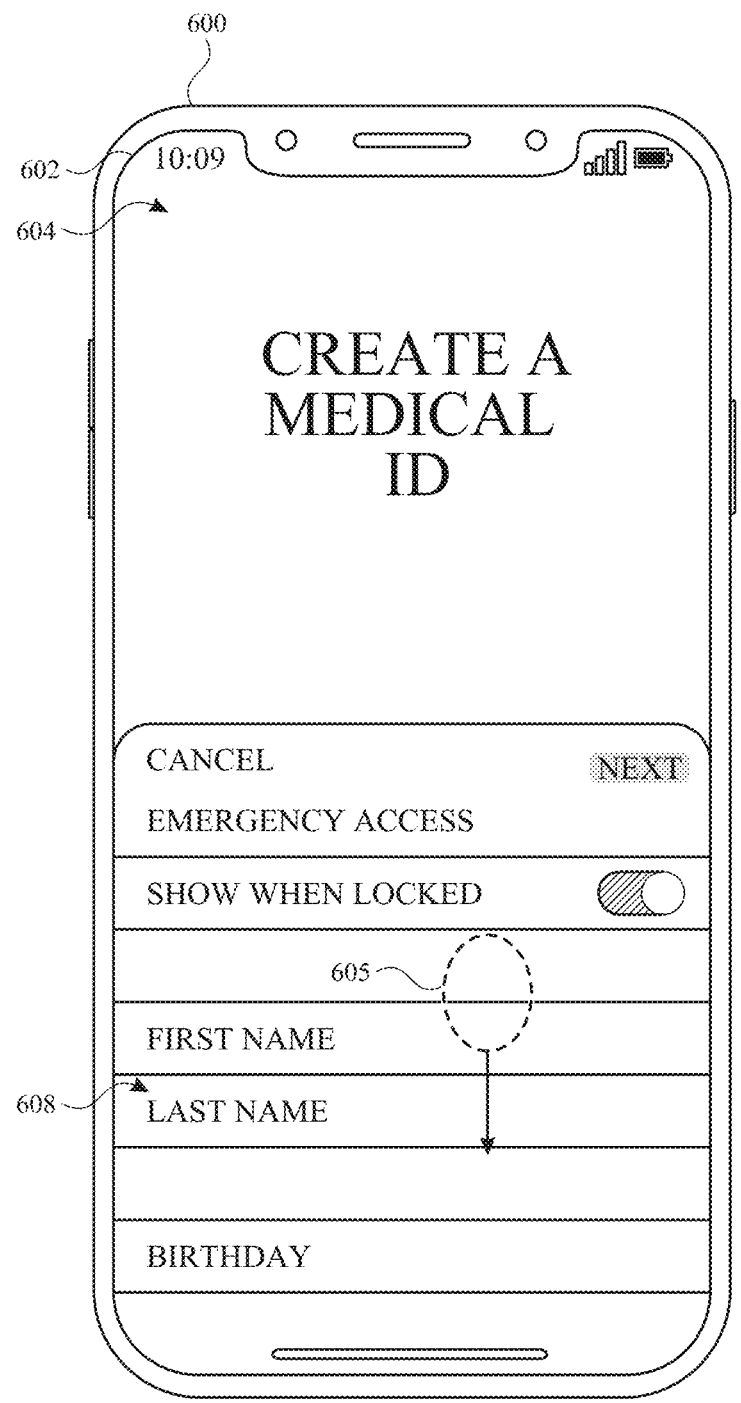
Figure 6E:
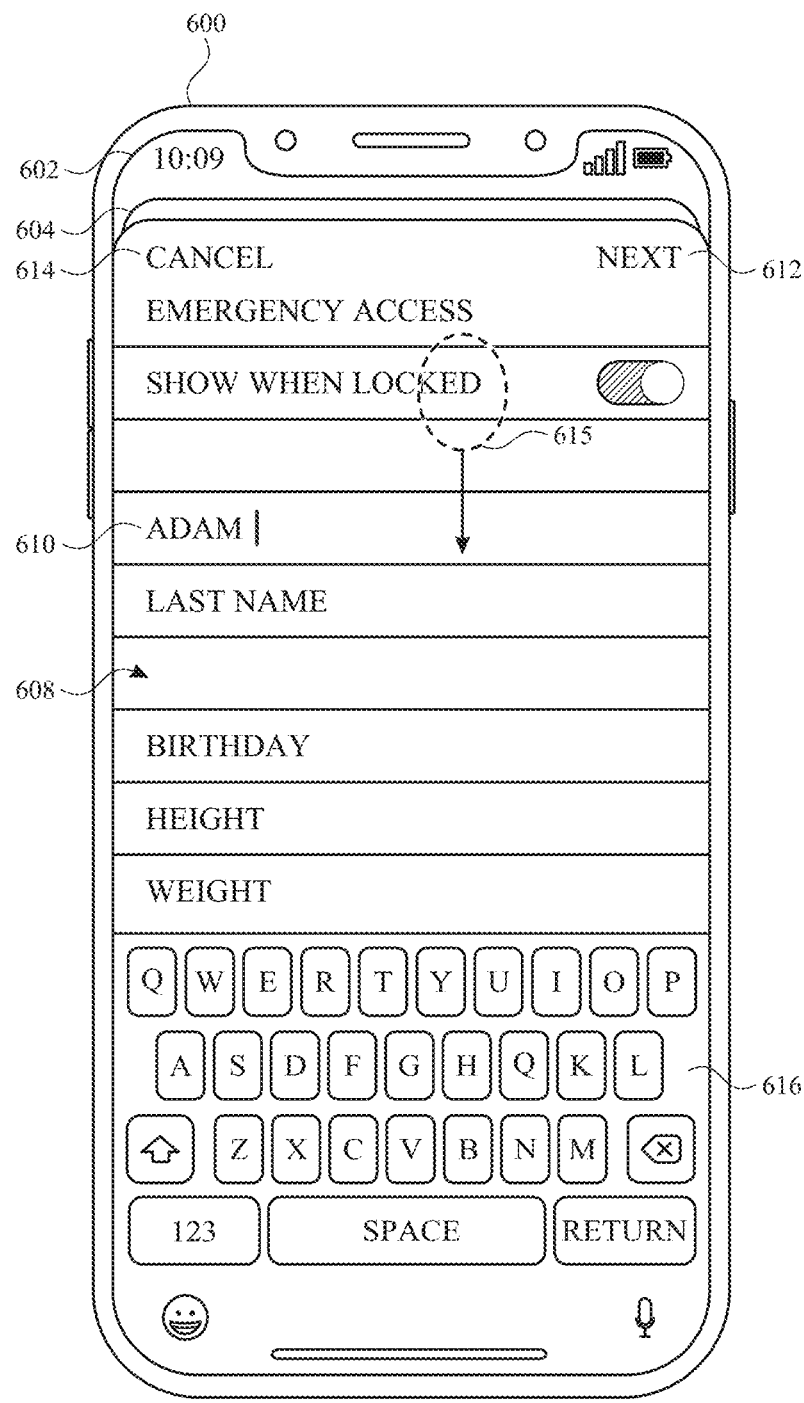
Figure 6F:
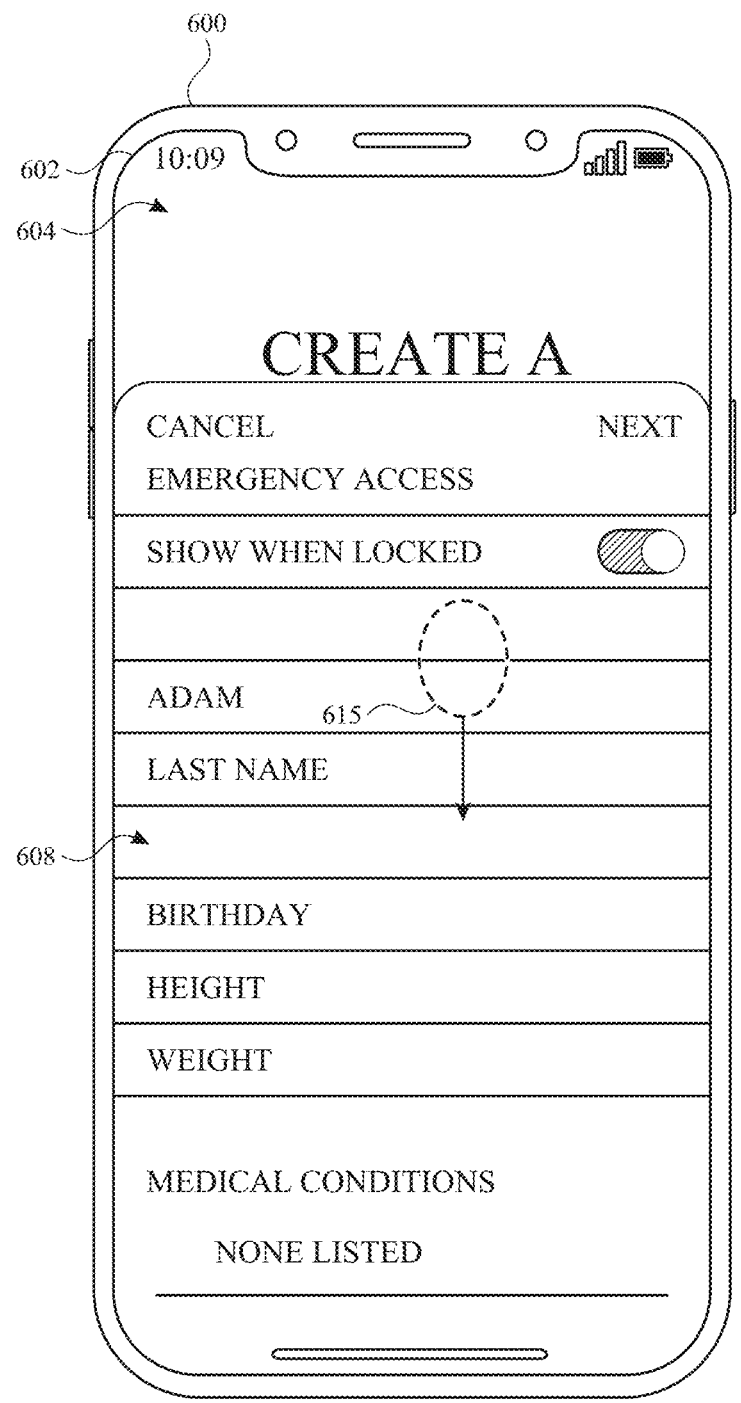
Figure 6G:
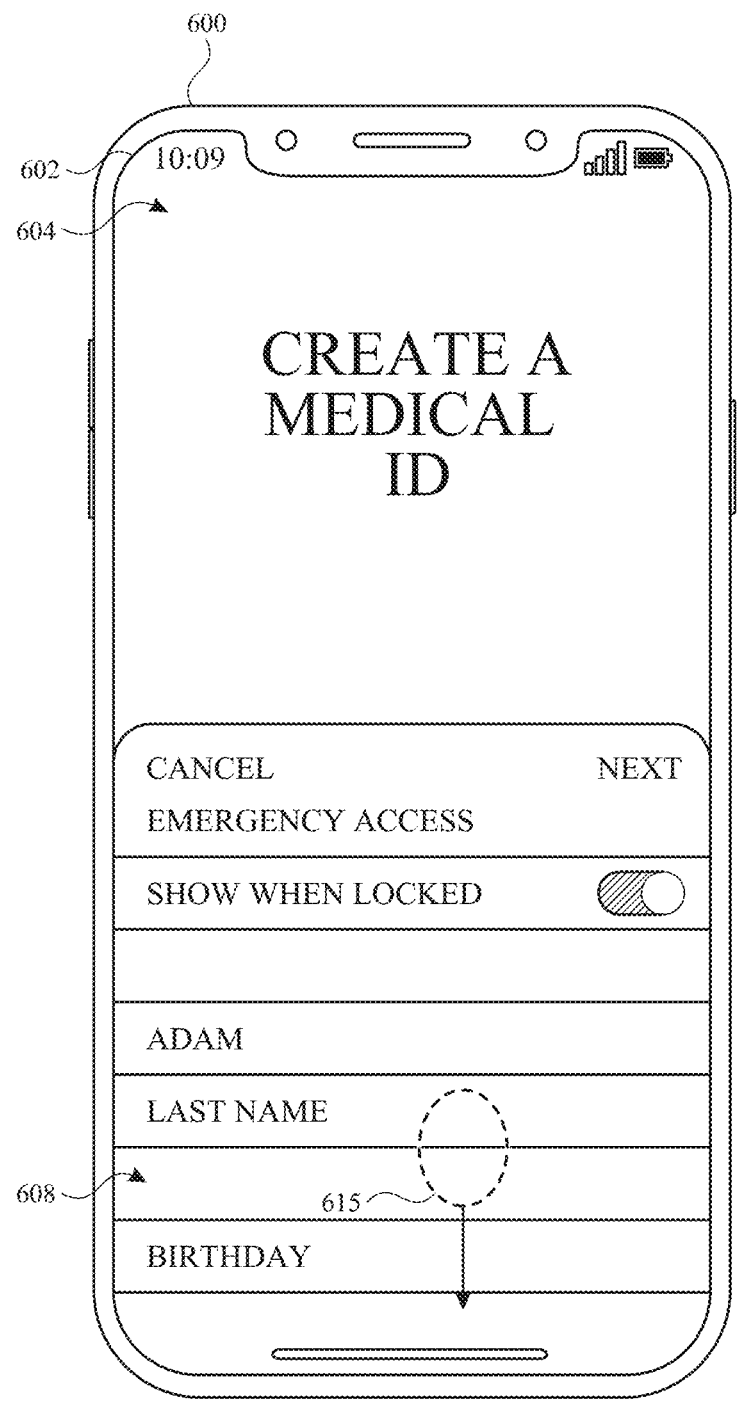
Figure 6H:
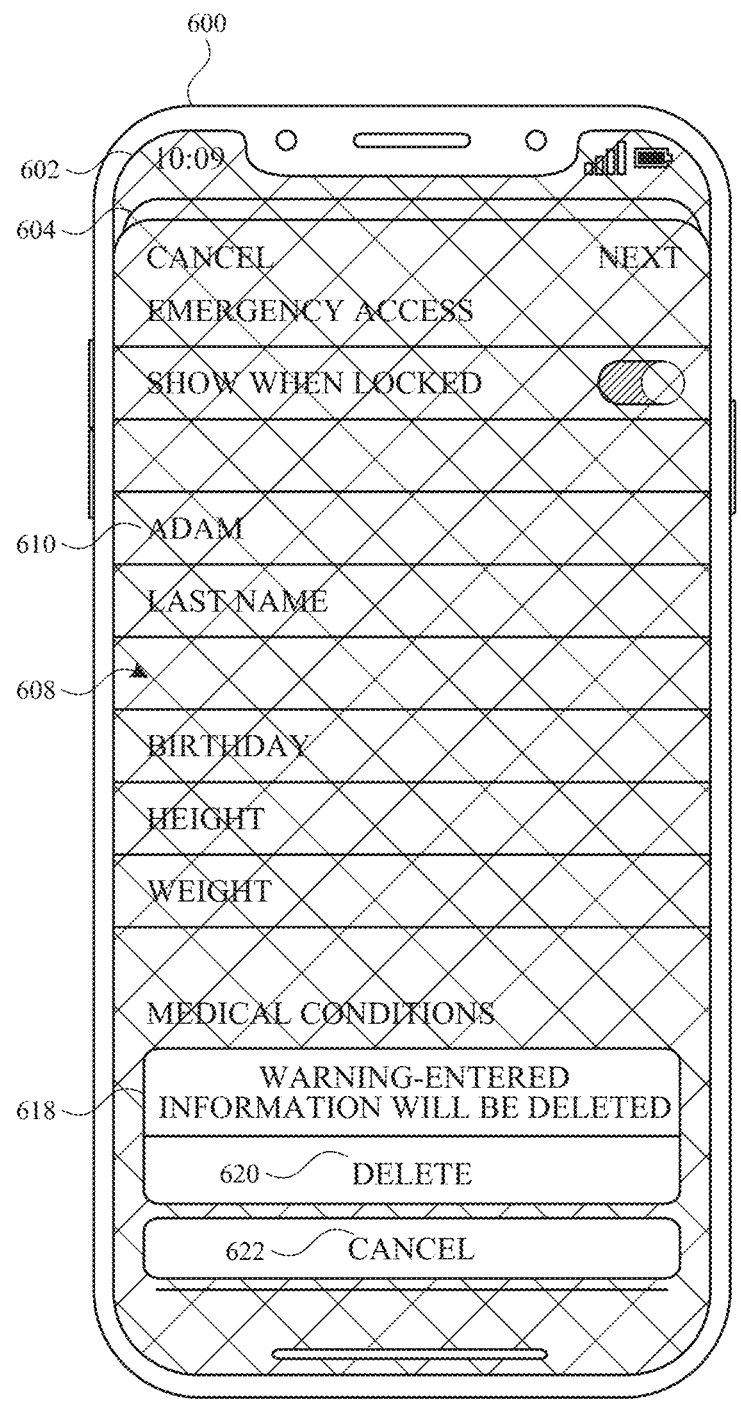
Figure 6I:
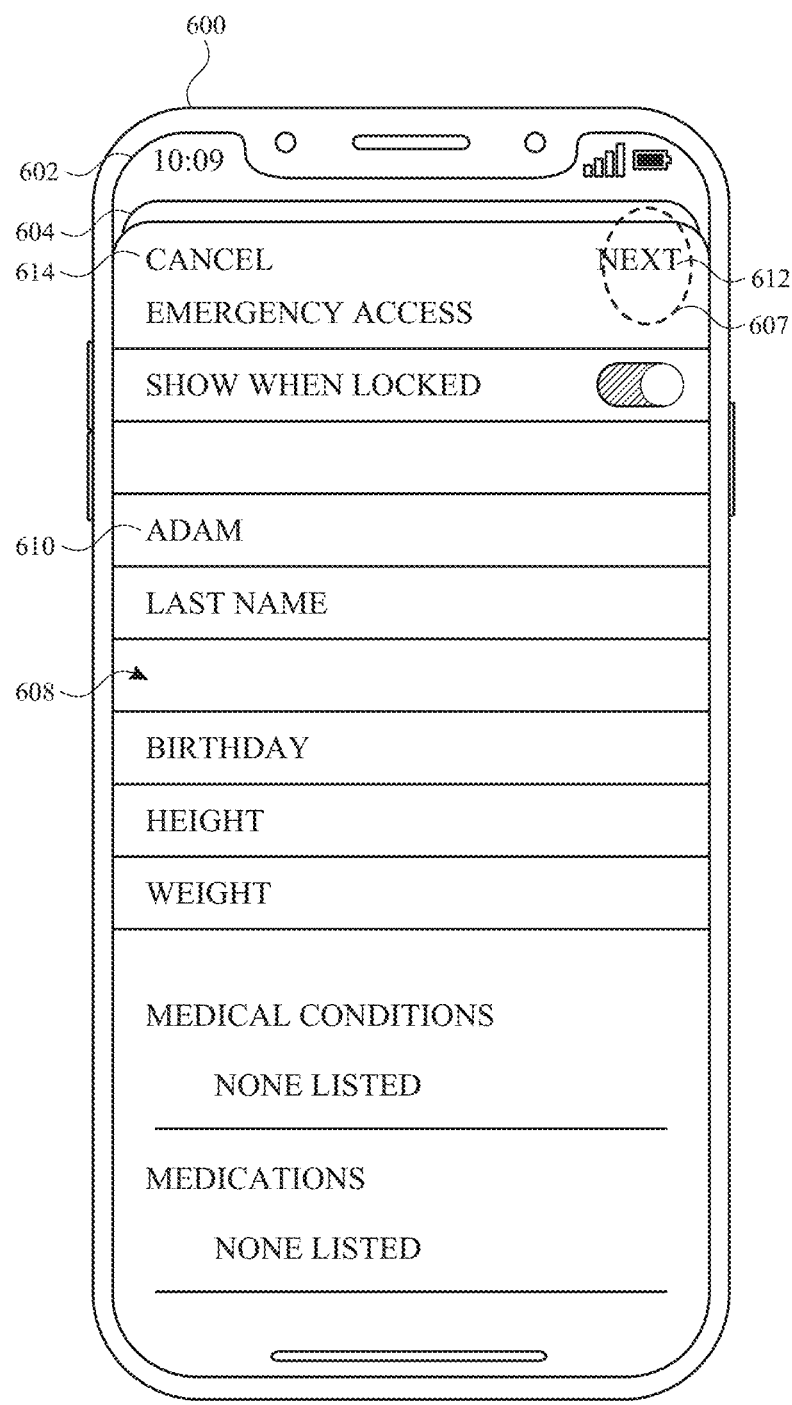
Figure 6J:
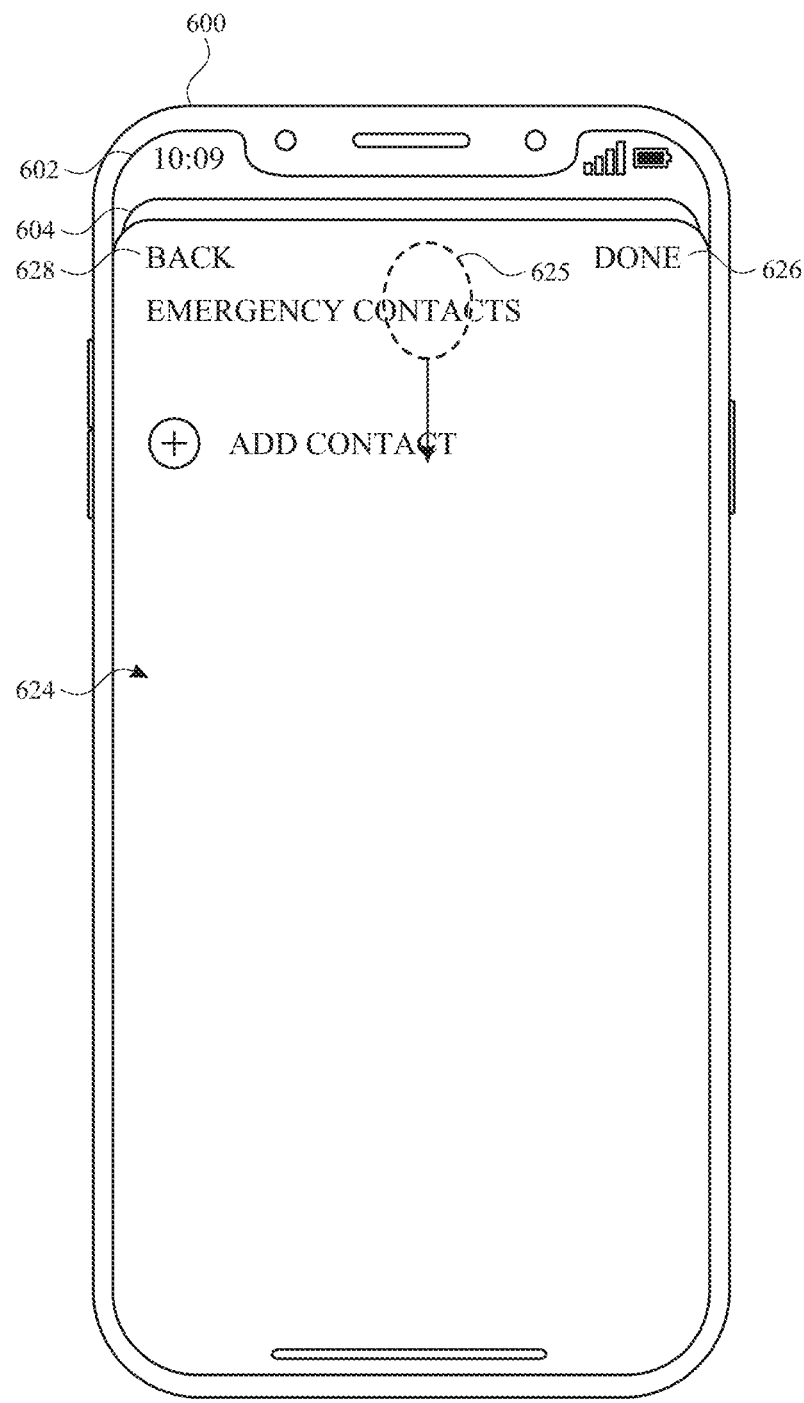
Figure 6K:
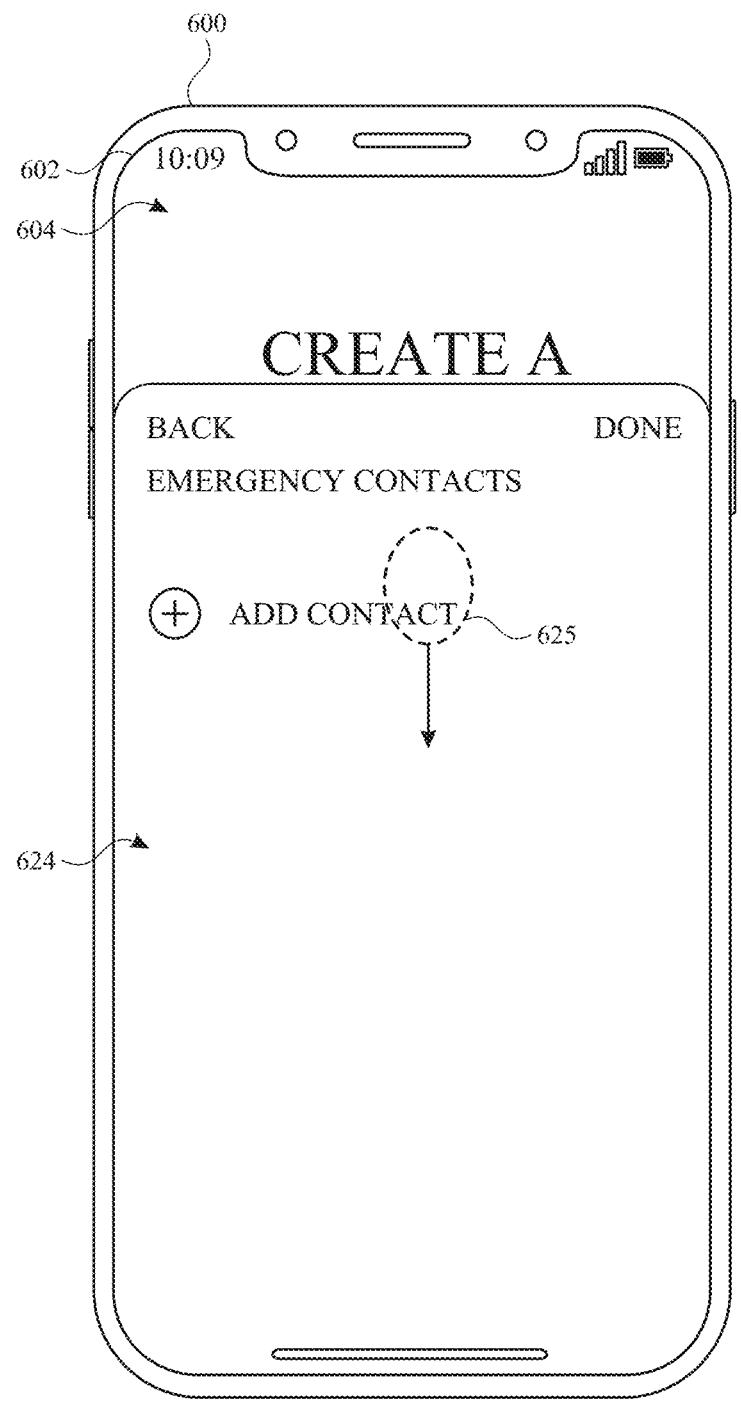
Figure 6L:
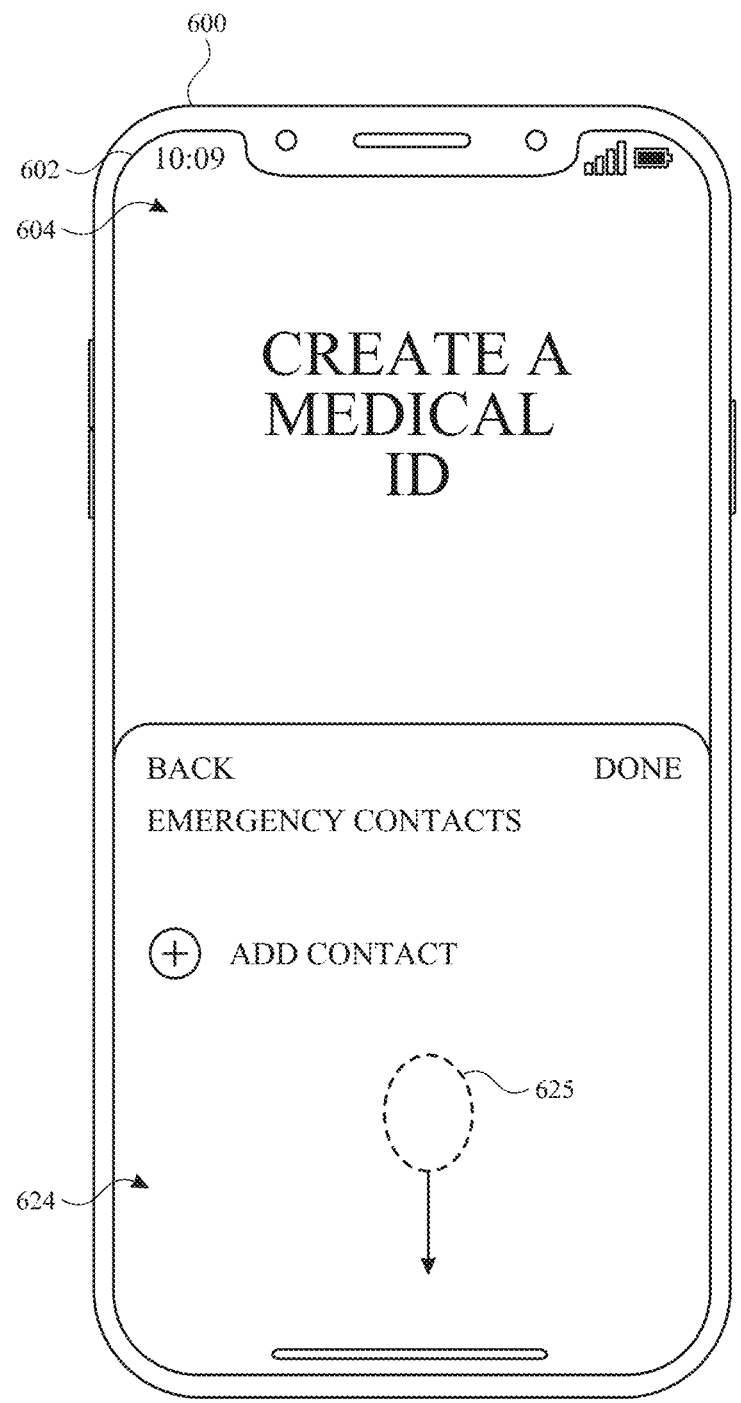
Figure 6M:
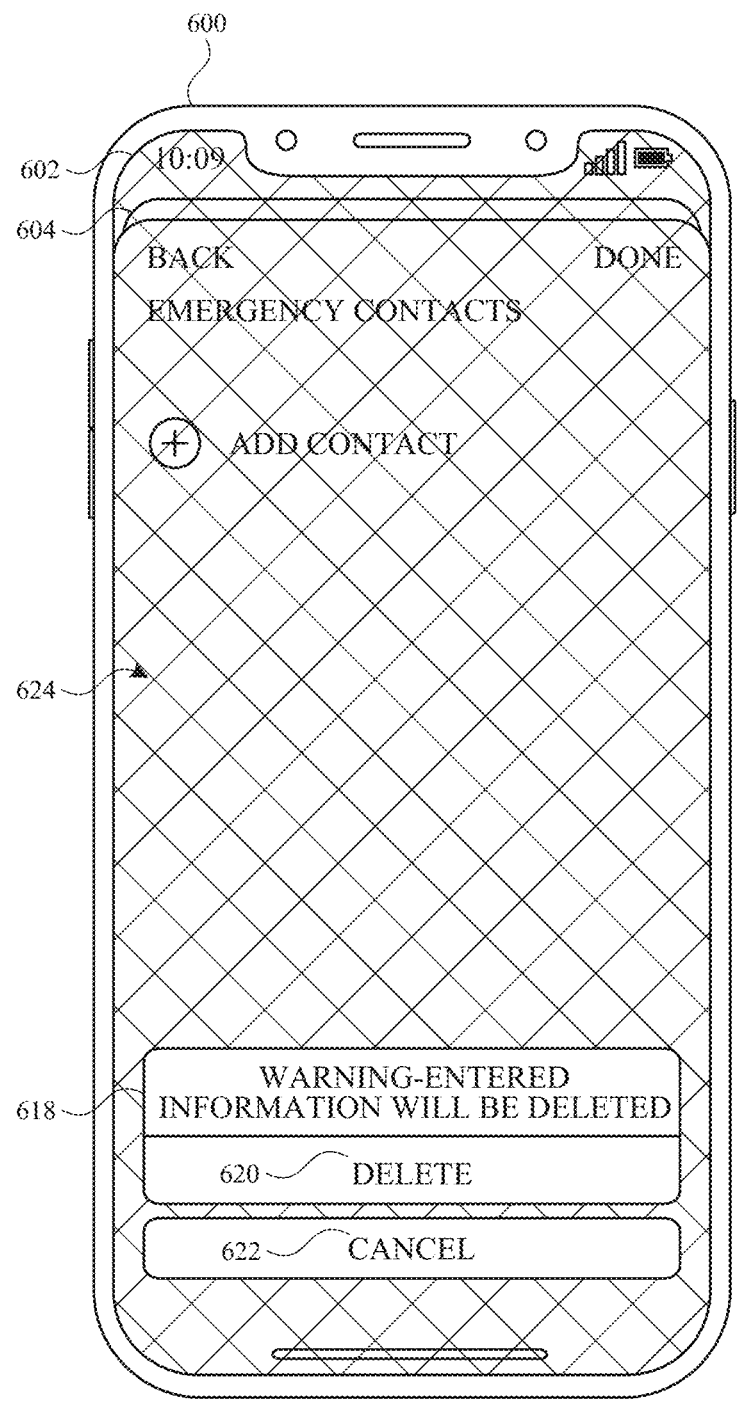
Figure 6N:
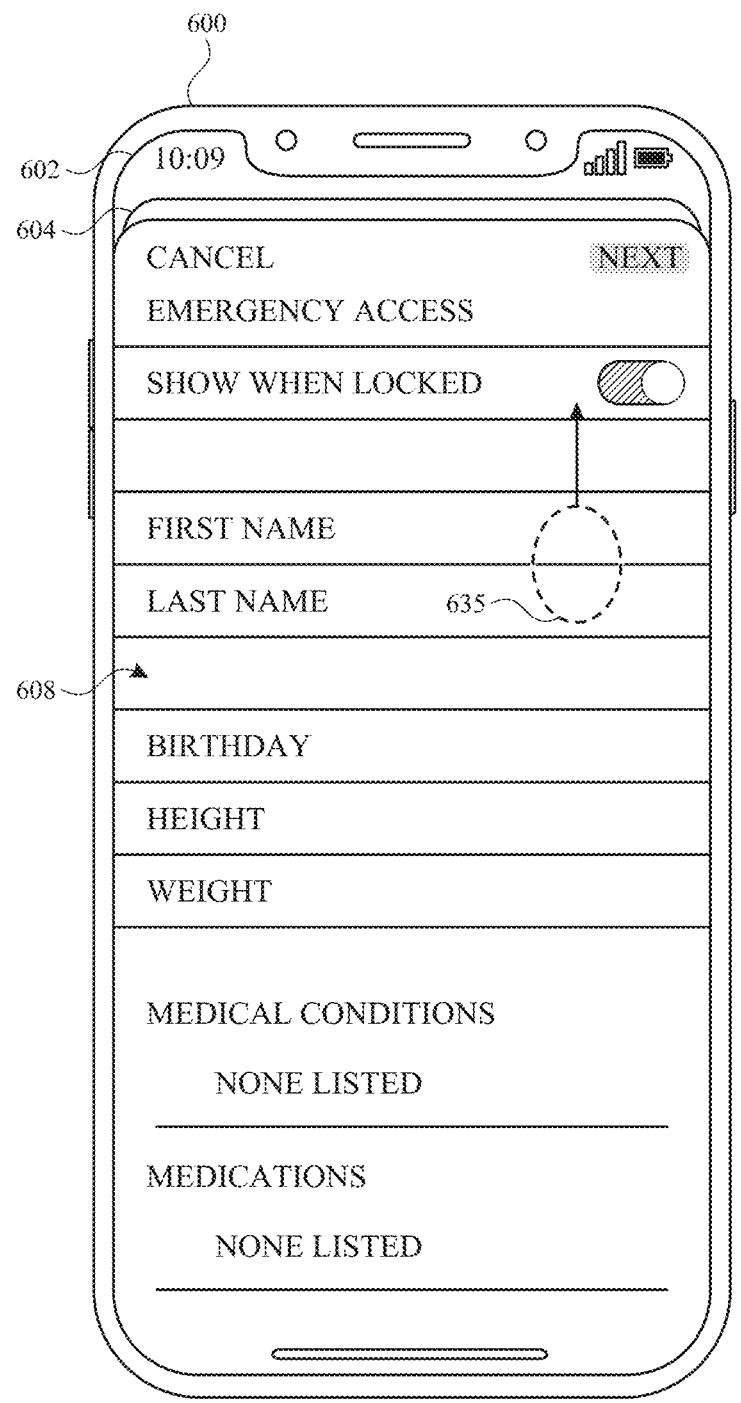
Figure 6O:
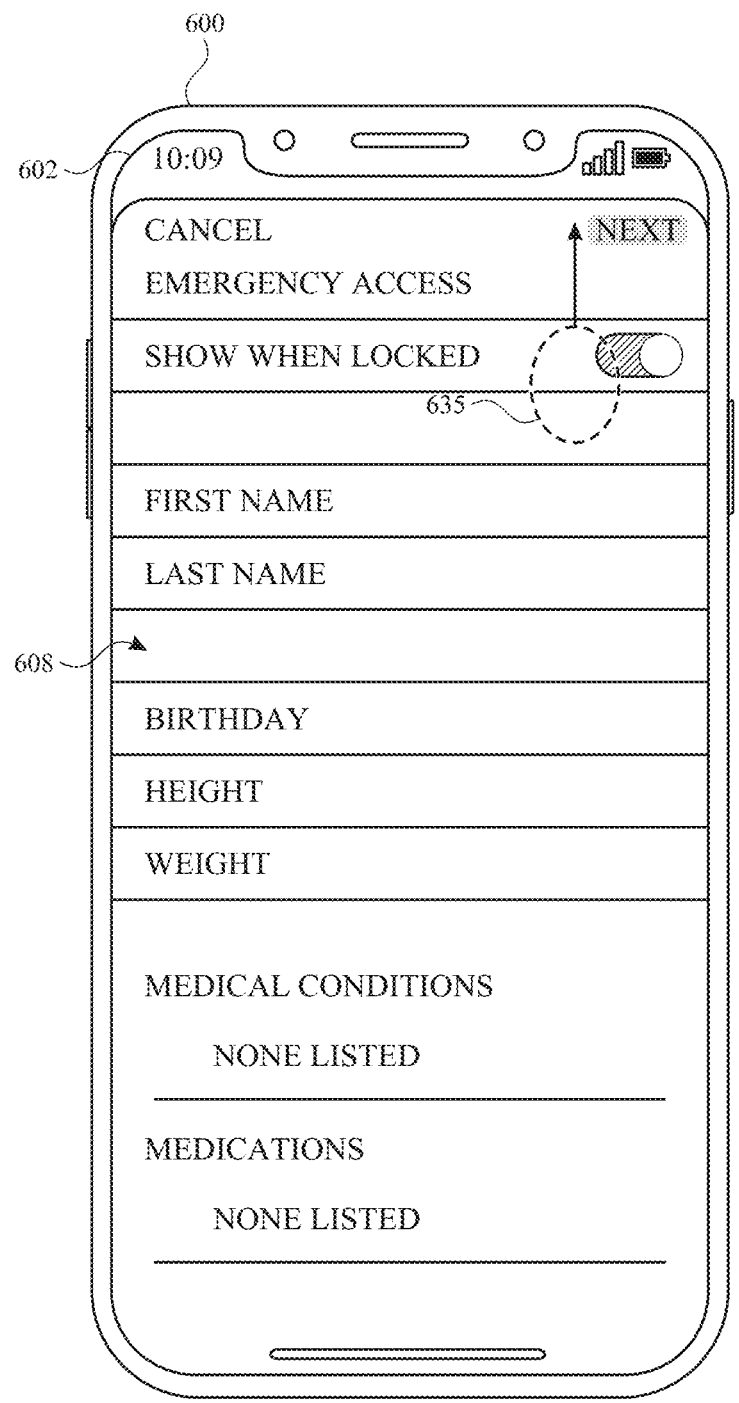

FIGS. 6A-6O illustrate exemplary user interfaces for interacting with UI objects, in accordance with some embodiments. The user interfaces in these figures are used to illustrate the processes described below, including the processes in FIG. 8.

FIG. 6A illustrates an electronic device 600 including a display device 602 (e.g., integrated with a touch-sensitive surface). In some embodiments, electronic device 600 includes one or more features of device 100, 300, or 500. Electronic device 600 displays, on display device 602, a user interface 604 (e.g., a medical identification interface). User interface 604 includes a continue affordance 606 for creating a medical identification. In response to detecting an input 603 (e.g., a tap gesture) corresponding to continue affordance 606, a UI object corresponding to a medical identification (e.g., UI object 608 as shown in FIG. 6B) is displayed.

FIG. 6B illustrates electronic device 600 displaying, on display device 602, UI object 608 (e.g., a UI object corresponding to a medical identification). UI object 608 is displayed overlaying a previous user interface that was displayed by electronic device 600 on display device 602 (e.g., user interface 604, as shown in FIG. 6A). In some embodiments, UI object 608 has an area less than the area of the previous user interface, so that a portion of the previous user interface (e.g., user interface 604) is visible in the background, as shown in FIG. 6B. In this way, in some embodiments, UI object 608 resembles a card overlaid on a previous user interface.

UI object 608 includes one or more entry fields 610. Entry fields 610 are initially displayed as empty fields without user-specified content (e.g., user-entered text). In some embodiments, entry fields 610 initially include default text (e.g., system-generated text, such as "first name" and "last name").

UI object 608 also includes next affordance 612 and cancel affordance 614. In some embodiments, when no user-specified content (e.g., user-entered text) has been entered into UI object 608 (e.g., entry fields 610 are empty or include default text), next affordance 612 is inactive. In some embodiments, while next affordance 612 is inactive, the next affordance 612 is not displayed. In some embodiments, while next affordance 612 is inactive, the next affordance 612 is displayed in a different manner than when it is active (e.g., in a different color font, such as grey). In some embodiments, in response to detecting an input (e.g., a tap gesture) corresponding to cancel affordance 614, UI object 608 ceases to be displayed and user interface 604 (as shown in FIG. 6A) is displayed.

In response to detecting an input 605 (e.g., a sliding or swipe gesture in a downward direction), UI object 608 moves (e.g., is translated) in the direction of the input 605, as further shown in FIGS. 6C and 6D. In some embodiments, when no user-specified content (e.g., user-entered text) has been entered into UI object 608 (e.g., entry fields 610 are empty or include default text), UI object 608 moves a distance that corresponds to the amount of movement of the input 605 (e.g., UI object 608 moves one-to-one with a finger as the finger slides or swipes downward on the display device 602).

FIG. 6C illustrates UI object 608 after the UI object 608 has been partially moved downward in response to input 605. If input 605 ceases (e.g., a liftoff of a finger is detected) before UI object 608 is moved downward past a threshold distance (e.g., past a point where the top border of UI object 608 is more than halfway down the display device 602), then UI object 608 returns to the position before input 605 began (e.g., the position shown in FIG. 6B).

FIG. 6D illustrates UI object 608 after the UI object 608 has been moved further downward in response to input 605. In FIG. 6D, UI object 608 is moved downward past the threshold distance (e.g., past a point where the top border of UI object 608 is more than halfway down the display device 602). After UI object has passed the threshold distance, when input 605 ceases (e.g., a liftoff of a finger is detected), IA object 608 ceases to be displayed (e.g., UI object 608 is dismissed) and user interface 604 is displayed, as shown in FIG. 6A.

FIG. 6E illustrates UI object 608 with user-specified content added to an entry field 610 (e.g., "ADAM"). In some embodiments, the user-specified content is added using an on-screen keyboard 616. In some embodiments, the user-specified content is added using a physical keyboard or other text entry techniques, such as voice recognition. In some embodiments, after user-specified content has been added to UI object 608, next affordance 612 is active (e.g., displayed, or displayed in a different manner than in FIG. 6B (e.g., a different color font, such as black)).

After adding user-specified content to UI object 608, an input 615 is detected (e.g., a sliding or swipe gesture in a downward direction). In response to detecting input 615, UI object 608 moves (e.g., is translated) in the direction of the input 615, as further shown in FIGS. 6F and 6G. When user-specified content has been included in UI object 608 (e.g., entry field 610 includes text "ADAM"), UI object 608 moves a distance that is less than the amount of movement of the input 615 (e.g., UI object 608 appears to resist movement by a finger as the finger slides or swipes downward on the display device 602). This reduced movement of UI object 608 indicates to a user that user-specified content is included in the UI object 608 and is shown, for example, in the position of input 615 relative to the UI object 608 in FIG. 6E (on the letters "ED") as compared to FIG. 6F (below the letters "ED").

FIG. 6F illustrates UI object 608 after the UI object 608 has been partially moved downward in response to input 615. If input 615 ceases (e.g., a liftoff of a finger is detected) before UI object 608 is moved downward past a threshold distance (e.g., past a point where the top border of UI object 608 is more than halfway down the display device 602), then UI object 608 returns to the position before input 615 began (e.g., the position shown in FIG. 6B).

FIG. 6G illustrates UI object 608 after the UI object 608 has been moved further downward in response to input 615. In FIG. 6G, UI object 608 is moved downward past the threshold distance (e.g., past a point where the top border of UI object 608 is more than halfway down the display device 602). In some embodiments, after UI object has passed the threshold distance, when input 615 ceases (e.g., a liftoff of a finger is detected), UI object 608 ceases to be displayed (e.g., UI object 608 is dismissed) and user interface 604 is displayed, as shown in FIG. 6A. In some embodiments, after UI object 608 has passed the threshold distance, when input 615 ceases (e.g., a liftoff of a finger is detected), a notification (as shown in FIG. 6H) is displayed indicating that a destructive action corresponding to the user-specified content (e.g., deleting "ADAM" from entry field 610) will be performed in response to detecting input 615.

FIG. 6H illustrates notification 618 indicating that a destructive action corresponding to the user-specified content will be performed if UI object 608 is dismissed. In some embodiments, notification 618 is displayed in response to detecting input 615 as shown in FIGS. 6E-6G. In some embodiments, notification 618 includes confirm option 620 (e.g., a "delete" affordance that confirms the user-specified content (e.g., "ADAM") will be deleted) and a cancel option 622. In response to detecting an input corresponding to the confirm option 620, notification 618 and UI object 608 cease to be displayed and user interface 604 as shown in FIG. 6A is displayed. When UI object 608 ceases to be displayed, the user-specified content that was added to UI object 608 (e.g., "ADAM" in entry field 610) is deleted. In response to detecting an input corresponding to the cancel option 622, notification 618 ceases to be displayed and UI object 608 is displayed with the user-specified content continuing to be included in the UI object 608, as shown in FIG. 6I. In some embodiments, notification 618 and UI object 608 cease to be displayed and the user-specified content is deleted automatically after a timer expires if no input corresponding to the confirm option 620 or cancel option 622 is detected. In some embodiments, notification 618 and UI object 608 cease to be displayed and the user-specified content is deleted in response to detecting a secondary dismiss input (e.g., a subsequent downward slide or swipe gesture after input 615).

FIG. 6I, illustrates UI object 608 with user-specified content continuing to be included in the UI object 608 (e.g., "ADAM" added to entry field 610). In some embodiments, UI object 608 is displayed with the user-specified content after detecting an input corresponding to the cancel option 622 shown in FIG. 6H. In some embodiments, UI object 608 is displayed with the user-specified content in response to detecting input 615 has ceased before UI object 608 is moved downward past a threshold distance (e.g., past a point where the top border of UI object 608 is more than halfway down the display device 602 as shown in FIG. 6F).

As shown in FIG. 6I, next affordance 612 is active (e.g., displayed, or displayed in a different manner than in FIG. 6B (e.g., a different color font, such as black)). When next affordance 612 is active and an input 607 corresponding to next affordance 612 is detected, UI object 608 is replaced with a subsequent UI object in a sequence of UI objects (e.g., UI object 624 as shown in FIG. 6J). The sequence of UI objects relate to common user input task (e.g., entering information for a medical identification).

FIG. 6J illustrates a subsequent UI object 624 in a series of UI objects. UI object 624 is displayed in response to detecting input 607 corresponding to next affordance 612 as shown in FIG. 6I. When UI object 624 is displayed it replaces the display of UI object 608 shown in FIG. 6I. UI object 624 is displayed overlaying the same earlier user interface as UI object 608 (e.g., user interface 604, as shown in FIG. 6A). In some embodiments, UI object 624 has an area less than the area of the earlier user interface, so that a portion of the earlier user interface (e.g., user interface 604) is visible in the background, as shown in FIG. 6J.

In response to detecting an input 625 (e.g., a sliding or swipe gesture in a downward direction), UI object 624 moves (e.g., is translated) in the direction of the input 625, as further shown in FIGS. 6K and 6L. When user-specified content has been included in a previous UI object in the sequence of UI objects (e.g., when an entry field 610 of UI object 608 includes user-specified content), UI object 624 moves a distance that is less than the amount of movement of the input 625 (e.g., UI object 624 appears to resist movement by a finger as the finger slides or swipes downward on the display device). This reduced movement of UI object 624 indicates to a user that user-specified content is included in previous UI objects in the sequence of UI objects (e.g., user-specified content is included in UI object 608).

FIG. 6K illustrates UI object 624 after the UI object 624 has been partially moved downward in response to input 625. If input 625 ceases (e.g., a liftoff of a finger is detected) before UI object 624 is moved downward past a threshold distance (e.g., past a point where the top border of UI object 624 is more than halfway down the display device 602), then UI object 624 returns to the position before input 625 began (e.g., the position shown in FIG. 6J).

FIG. 6L illustrates UI object 624 after the UI object 624 has been moved further downward in response to input 625. In FIG. 6L, UI object 624 is moved downward past the threshold distance (e.g., past a point where the top border of UI object 624 is more than halfway down the display device 602). In some embodiments, after UI object has passed the threshold distance, when input 625 ceases (e.g., a liftoff of a finger is detected), the sequence of UI objects, including UI object 608 and UI object 624, cease to be displayed (e.g., UI object 624 is dismissed) and user interface 604 is displayed, as shown in FIG. 6A. In some embodiments, after UI object has passed the threshold distance, when input 625 ceases (e.g., a liftoff of a finger is detected), a notification (as shown in FIG. 6M) is displayed indicating that a destructive action corresponding to the user-specified content (e.g., deleting "ADAM" from entry field 610 of UI object 608) will be performed in response to detecting input 625.

FIG. 6M illustrates notification 618 indicating that a destructive action corresponding to the user-specified content in an earlier UI object in the sequence of UI objects will be performed if UI object 624 is dismissed (e.g., text entered into entry field 610 of UI object 608 will be deleted). In some embodiments, notification 618 is displayed in response to detecting input 625 as shown in FIGS. 6J-6L. In some embodiments, notification 618 includes confirm option 620 and a cancel option 622. In response to detecting an input corresponding to the confirm option 620, notification 618 and UI object 624 cease to be displayed and user interface 604 as shown in FIG. 6A is displayed. When UI object 608 ceases to be displayed, the user-specified content that was added to any earlier UI objects in the sequence of UI objects (e.g., "ADAM" in entry field 610 of UI object 608) is deleted. In response to detecting an input corresponding to the cancel option 622, notification 618 ceases to be displayed and UI object 624 is displayed as shown in FIG. 6J. User-specified content that was added to earlier UI objects in the sequence of UI objects also remains in place in response to detecting an input corresponding to the cancel option 622. In some embodiments, notification 618 and UI object 624 cease to be displayed and the user-specified content is deleted from UI objects in the sequence of UI objects automatically after a timer expires if no input corresponding to the confirm option 620 or cancel option 622 is detected. In some embodiments, notification 618 and UI object 608 cease to be displayed and the user-specified content is deleted from UI objects in the sequence of UI objects in response to detecting a secondary dismiss input (e.g., a subsequent downward sliding or swipe gesture after input 625).

In some embodiments, as illustrated in FIGS. 6N and 6O, in response to detecting an upward input 635 on display device 602 (e.g., a sliding or swipe gesture in a upward direction), UI object 608 moves (e.g., is translated) in the direction of the upward input 635. In some embodiments, the distance that the UI object 608 moves is limited by a boundary of the display device 602 (e.g., an upper edge of the display device 602), regardless of whether UI object 608 includes user-specified content. For example, as shown in FIG. 6O, as the upward input 635 continues, the top edge of UI object 608 does not intersect with the upper boundary of display device 602.

FIGS. 7A-7H illustrate exemplary user interfaces for interacting with UI objects, in accordance with some embodiments. The user interfaces in these figures are used to illustrate the processes described below, including the processes in FIG. 8.

Figure 7A:
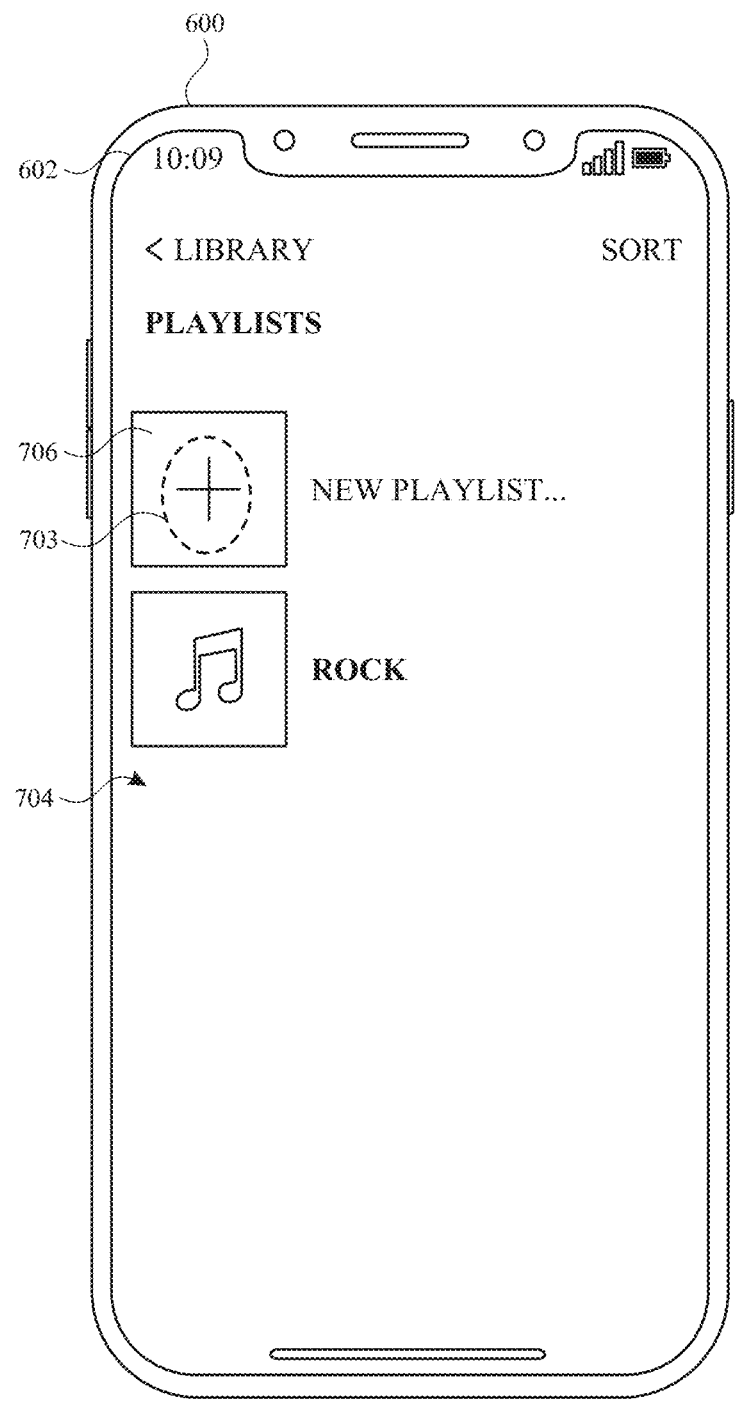
FIGS. 7A-7H illustrate exemplary user interfaces for interacting with UI objects in accordance with some embodiments.

FIG. 7A illustrates electronic device 600 displaying, on display device 602, a user interface 704 (e.g., a playlist interface of a music application). User interface 704 includes a new playlist affordance 706 for creating a new playlist of songs in the music application. In response to detecting an input 703 (e.g., a tap gesture) corresponding to new playlist affordance 606, a UI object corresponding to a new playlist (e.g., UI object 708 as shown in FIG. 7B) is displayed.

Figure 7B:
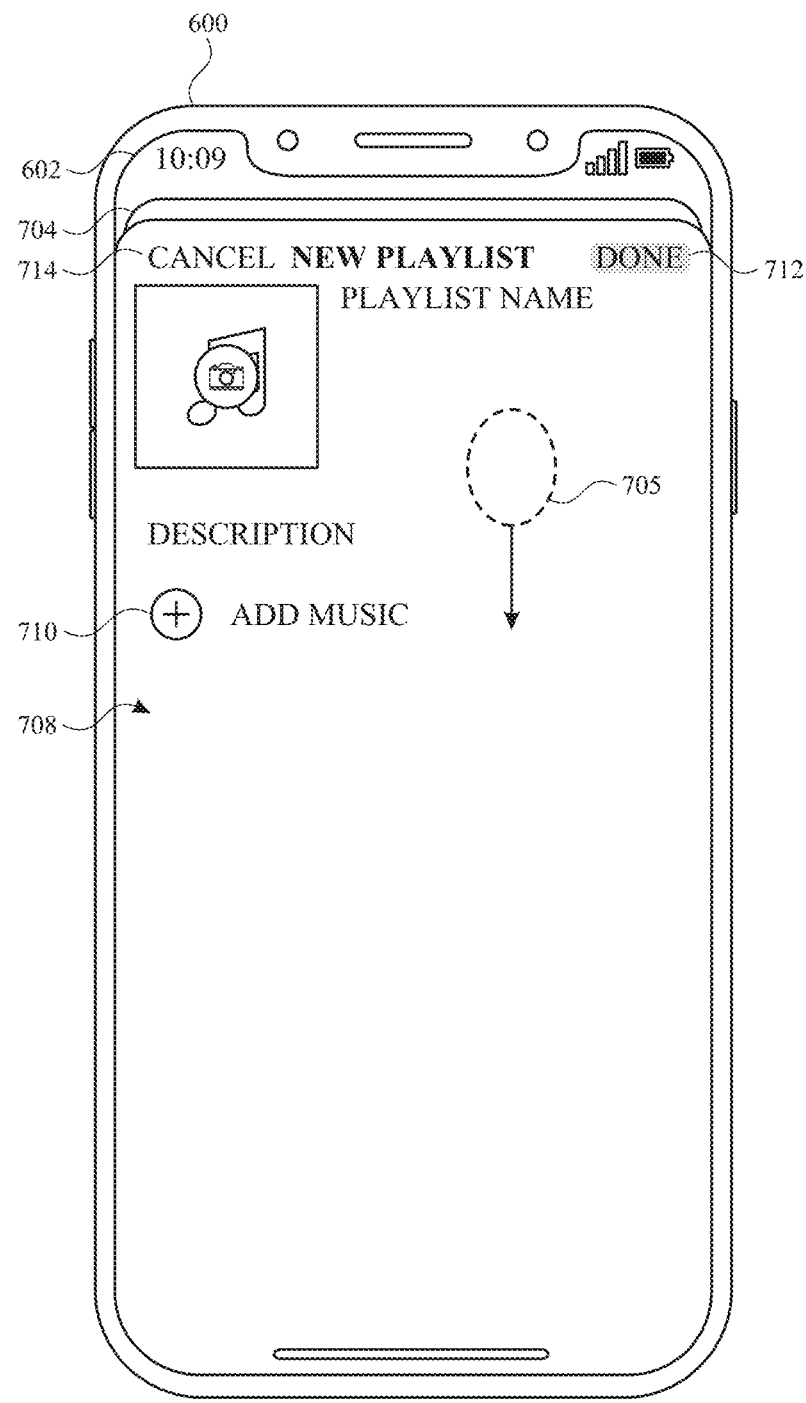

FIG. 7B illustrates electronic device 600 displaying, on display device 602, UI object 708 (e.g., a UI object for adding songs to a new playlist). UI object 708 is displayed overlaying a previous user interface that was displayed by electronic device 600 on display device 602 (e.g., user interface 704, as shown in FIG. 7A). In some embodiments, UI object 708 has an area less than the area of the previous user interface, so that a portion of the previous user interface (e.g., user interface 704) is visible in the background, as shown in FIG. 7B. In this way, in some embodiments, UI object 708 resembles a card overlaid on a previous user interface.

UI object 708 includes an add music affordance 710. In response to detecting an input corresponding to add music affordance 710, one or more songs can be added to the new playlist corresponding to UI object 708. In some embodiments, the new playlist corresponding to UI object 708 is automatically populated with music, and add new music affordance 710 allows a user to add additional songs to the pre-populated playlist.

UI object 708 also includes done affordance 712 and cancel affordance 714. In some embodiments, when no user-specified content (e.g., a song added to the playlist by a user) has been included in UI object 708 (e.g., the new playlist includes no user-selected songs), done affordance 712 is inactive. In some embodiments, while done affordance 712 is inactive, the done affordance 712 is not displayed. In some embodiments, while done affordance 712 is inactive, the done affordance 712 is displayed in a different manner than when it is active (e.g., in a different color font, such as grey). In some embodiments, in response to detecting an input (e.g., a tap gesture) corresponding to cancel affordance 714, UI object 708 ceases to be displayed and user interface 704 (as shown in FIG. 7A) is displayed.

Figure 7C:
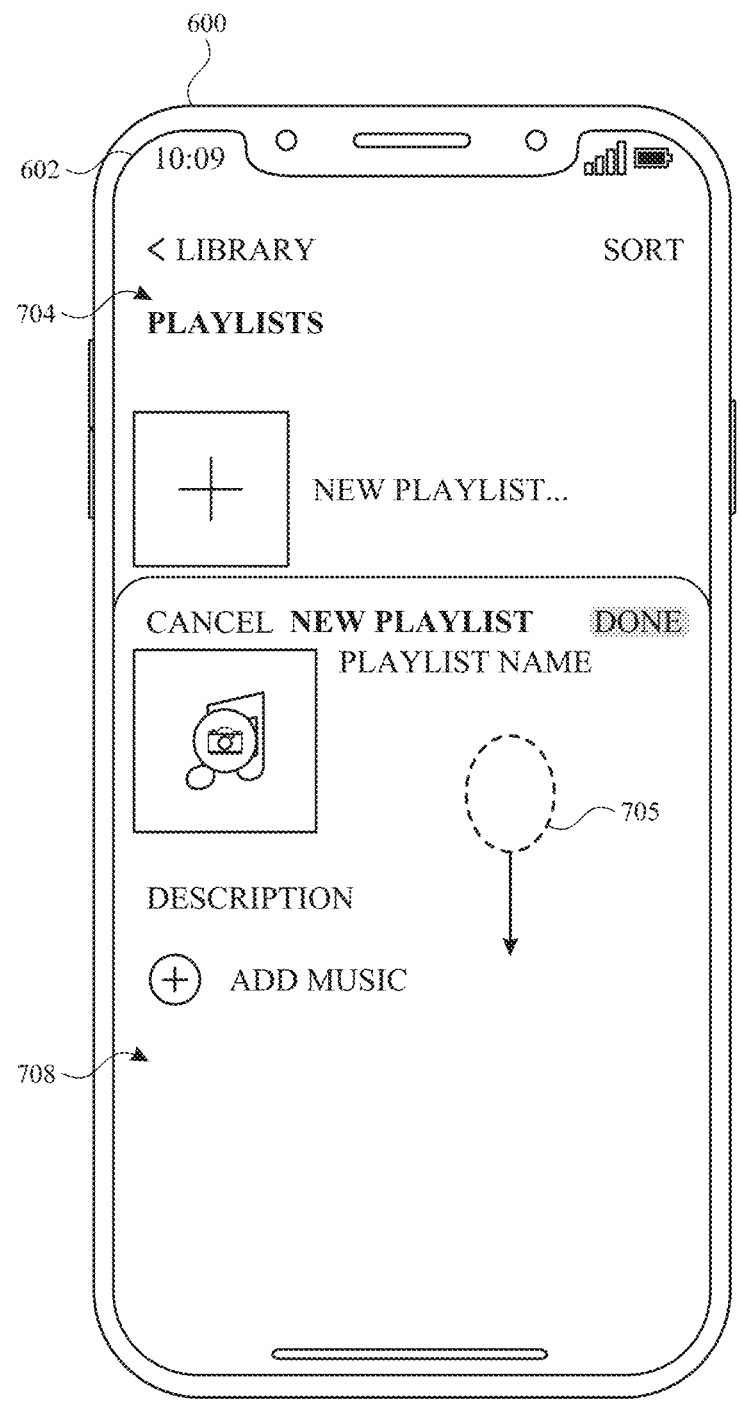
Figure 7D:
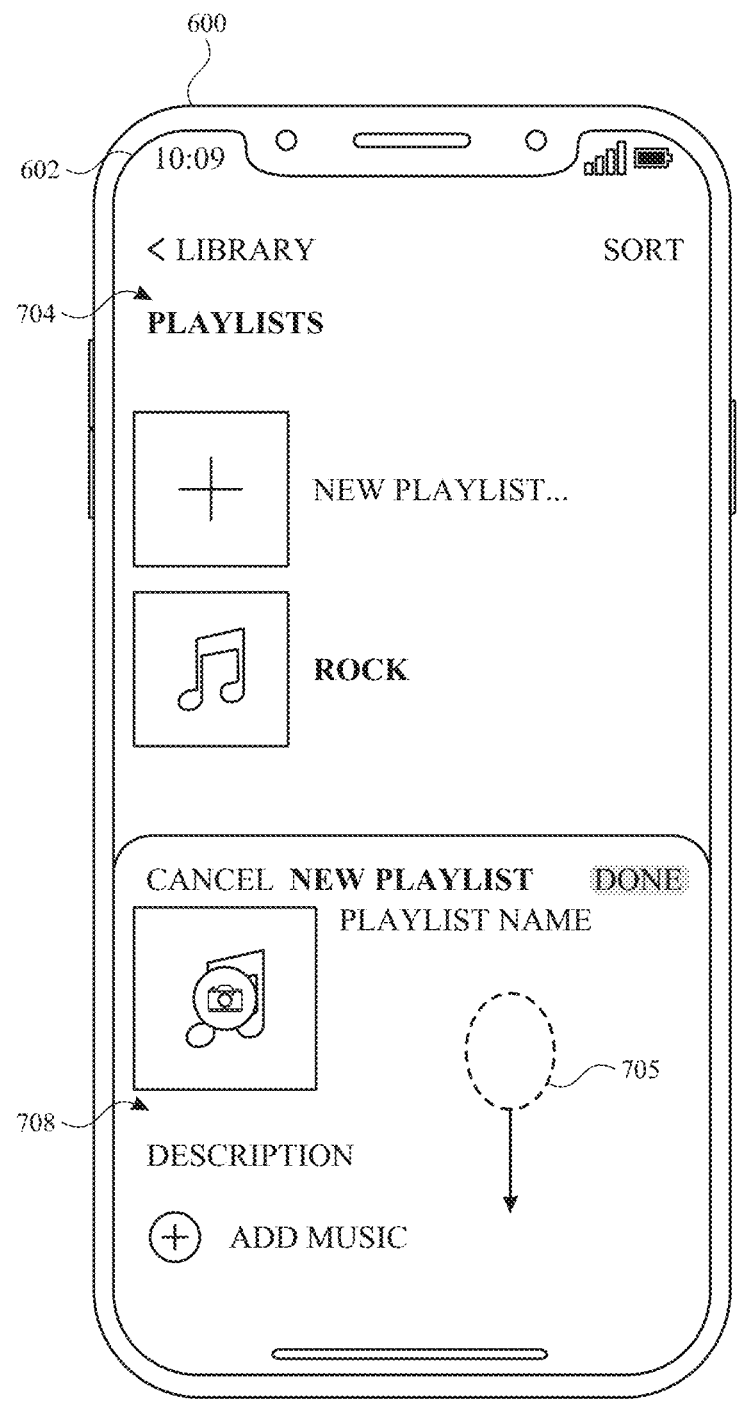

In response to detecting an input 705 (e.g., a sliding or swipe gesture in a downward direction), UI object 708 moves (e.g., is translated) in the direction of the input 705, as further shown in FIGS. 7C and 7D. In some embodiments, when no user-specified content (e.g., a song added to the playlist by a user) has been included in UI object 708, UI object 708 moves a distance that corresponds to the amount of movement of the input 705 (e.g., UI object 708 moves one-to-one with a finger as the finger slides or swipes downward on the display device 602).

FIG. 7C illustrates UI object 708 after the UI object 708 has been partially moved downward in response to input 705. If input 705 ceases (e.g., a liftoff of a finger is detected) before UI object 708 is moved downward past a threshold distance (e.g., past a point where the top border of UI object 708 is more than halfway down the display device 602), then UI object 708 returns to the position before input 705 began (e.g., the position shown in FIG. 7B).

FIG. 7D illustrates UI object 708 after the UI object 708 has been moved further downward in response to input 705. In FIG. 7D, UI object 708 is moved downward past the threshold distance (e.g., past a point where the top border of UI object 708 is more than halfway down the display device 702). After UI object has passed the threshold distance, when input 705 ceases (e.g., a liftoff of a finger is detected), UI object 708 ceases to be displayed (e.g., UI object 708 is dismissed) and user interface 704 is displayed, as shown in FIG. 7A.

Figure 7E:
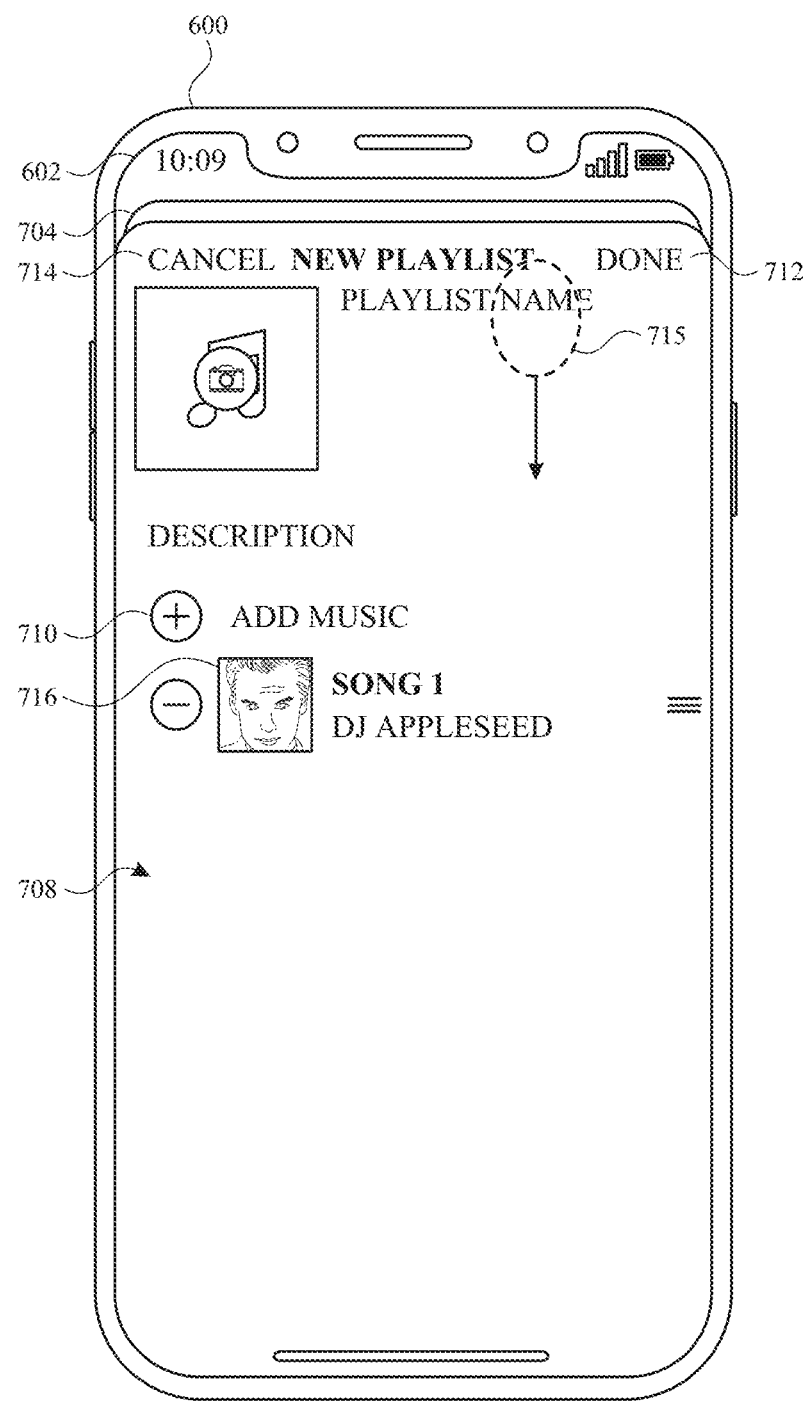

FIG. 7E illustrates UI object 708 with user-specified content included in the UI object 708 (e.g., a song 716 added to the playlist by a user). In some embodiments, after user-specified content has been added to UI object 708, done affordance 612 is active (e.g., displayed, or displayed in a different manner than in FIG. 7B (e.g., a different color font, such as black)).

After adding user-specified content to UI object 708, an input 715 is detected (e.g., a sliding or swipe gesture in a downward direction). In response to detecting input 715, UI object 708 moves (e.g., is translated) in the direction of the input 715, as further shown in FIGS. 7F and 7G. When user-specified content has been included in UI object 708 (e.g., a song 716 has been added to the playlist), UI object 708 moves a distance that is less than the amount of movement of the input 715 (e.g., UI object 708 appears to resist movement by a finger as the finger slides or swipes downward on the display device 602). This reduced movement of UI object 708 indicates to a user that user-specified content is included in the UI object 608.

Figure 7F:
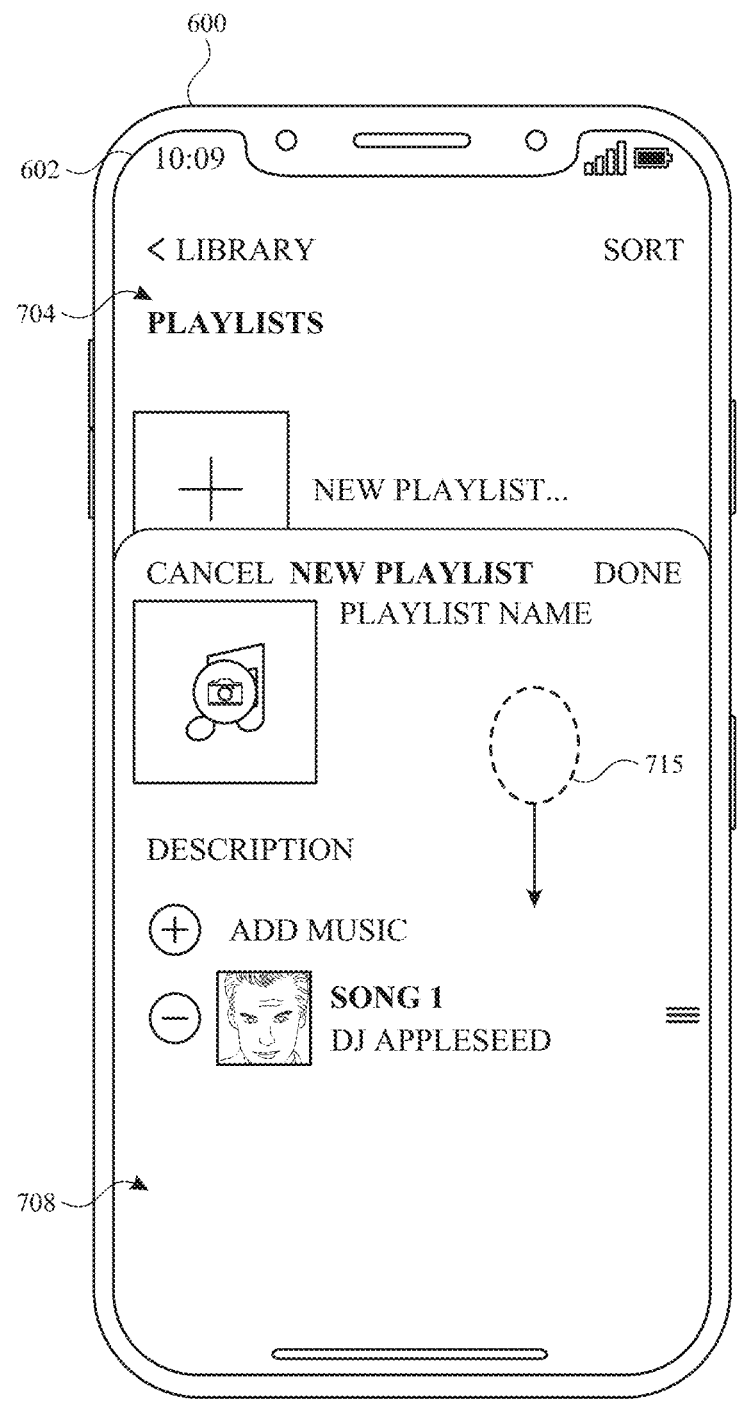

FIG. 7F illustrates UI object 708 after the UI object 708 has been partially moved downward in response to input 715. If input 715 ceases (e.g., a liftoff of a finger is detected) before UI object 708 is moved downward past a threshold distance (e.g., past a point where the top border of UI object 708 is more than halfway down the display device 602), then UI object 708 returns to the position before input 715 began (e.g., the position shown in FIG. 7B).

Figure 7G:
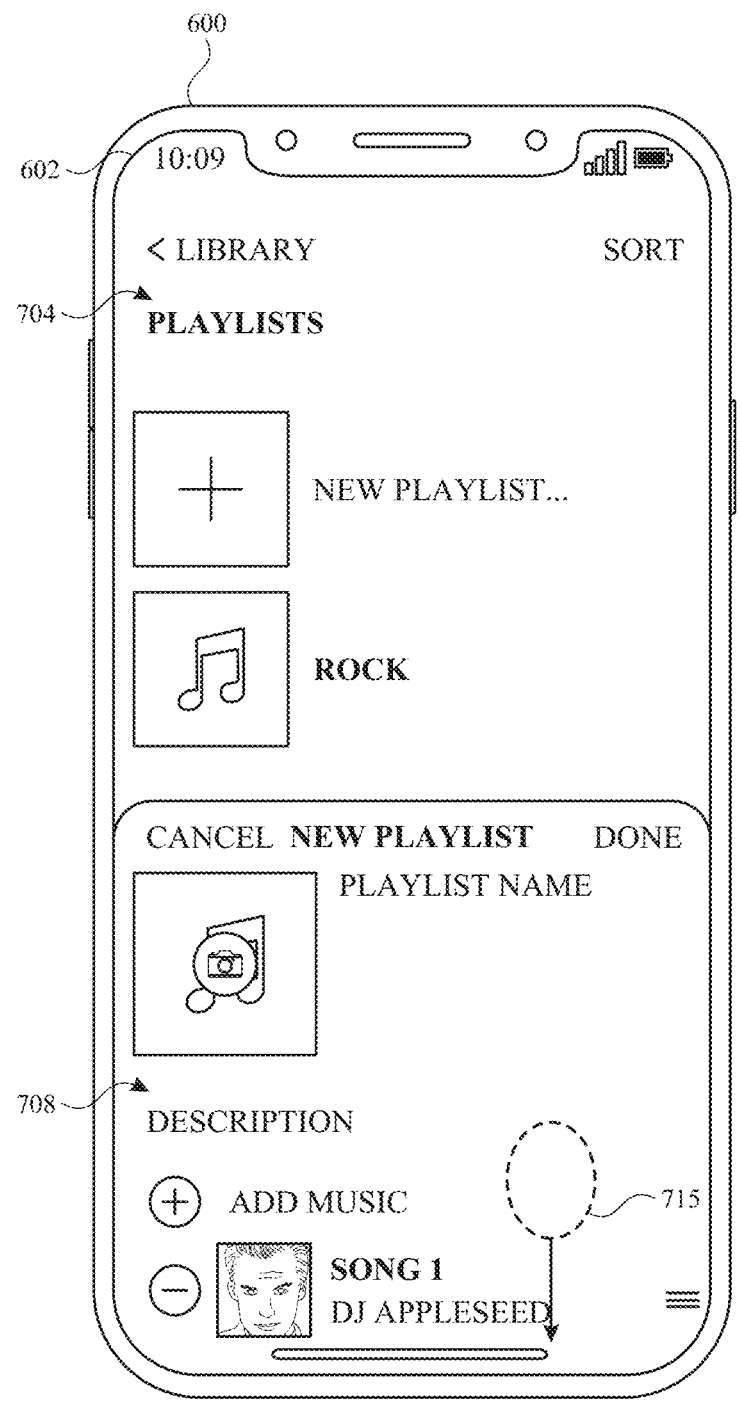

FIG. 7G illustrates UI object 708 after the UI object 708 has been moved further downward in response to input 715. In FIG. 7G, UI object 708 is moved downward past the threshold distance (e.g., past a point where the top border of UI object 708 is more than halfway down the display device 602). In some embodiments, after UI object 708 has passed the threshold distance, when input 715 ceases (e.g., a liftoff of a finger is detected), UI object 708 ceases to be displayed (e.g., UI object 708 is dismissed) and user interface 704 is displayed, as shown in FIG. 7A. In some embodiments, after UI object 708 has passed the threshold distance, when input 715 ceases (e.g., a liftoff of a finger is detected), a notification (as shown in FIG. 7H) is displayed indicating that a destructive action corresponding to the user-specified content will be performed (e.g., added song(s) 716 will be discarded from the playlist) in response to detecting input 715.

Figure 7H:
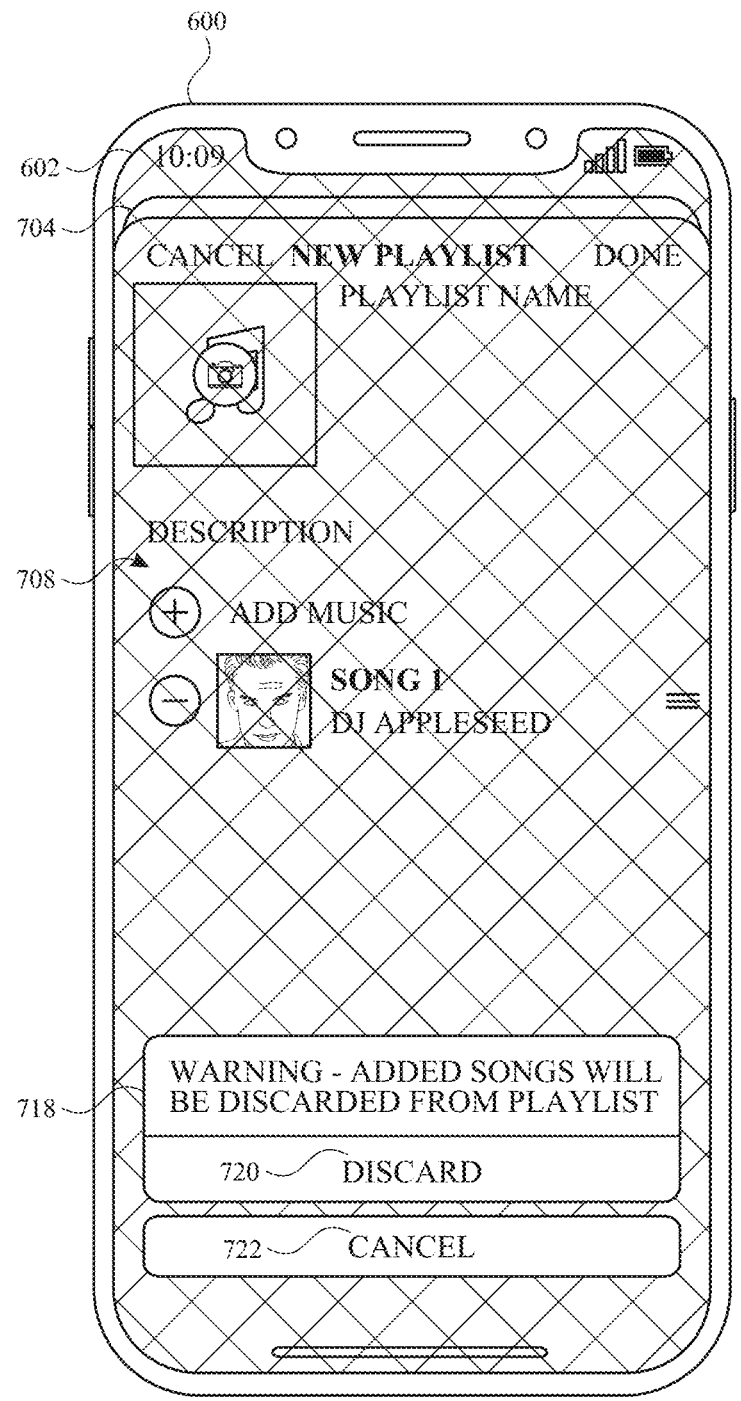

FIG. 7H illustrates notification 718 indicating that a destructive action corresponding to the user-specified content will be performed if UI object 708 is dismissed. In some embodiments, notification 718 is displayed in response to detecting input 715 as shown in FIGS. 7E-7G. In some embodiments, notification 718 includes confirm option 720 (e.g., a "discard" affordance that confirms the user-specified content (e.g., added song(s) 716) will be discarded) and a cancel option 722. In response to detecting an input corresponding to the confirm option 720, notification 718 and UI object 708 cease to be displayed and user interface 704 as shown in FIG. 7A is displayed. When UI object 708 ceases to be displayed, the user-specified content that was included in UI object 708 (e.g., song 716 added to the playlist) is discarded. In response to detecting an input corresponding to the cancel option 722, notification 718 ceases to be displayed and UI object 708 is displayed with the user-specified content continuing to be included in the UI object, as shown in FIG. 7E. In some embodiments, notification 718 and UI object 708 cease to be displayed and the user-specified content is discarded automatically after a timer expires if no input corresponding to the confirm option 720 or cancel option 722 is detected. In some embodiments, notification 718 and UI object 708 cease to be displayed and the user-specified content is discarded in response to detecting a secondary dismiss input (e.g., a subsequent downward slide or swipe gesture after input 715).

FIG. 8 is a flow diagram illustrating a method for interacting with UI objects using an electronic device in accordance with some embodiments. Method 800 is performed at a device (e.g., 100, 300, 500, 600) with a touch-sensitive display device (e.g., 602). Some operations in method 800 are, optionally, combined, the orders of some operations are, optionally, changed, and some operations are, optionally, omitted.

As described below, method 800 provides an intuitive way for interacting with a UI object. The method reduces the cognitive burden on a user by indicating to the user during the interaction that the UI object includes user-specified content, thereby creating a more efficient human-machine interface. For battery-operated computing devices, enabling a user to recognize when a UI object includes user-specified content faster and more efficiently conserves power and increases the time between battery charges.

The electronic device (e.g., 600) displays (802), via the touch-sensitive display device (e.g., 602), a user interface object (e.g., 608, 624, 708) (e.g., a card) in a user interface.

The electronic device detects (804), via the touch-sensitive display device, an input (e.g., 605, 615, 625, 705, 715) directed to the user interface object (e.g., a swipe gesture on the UI object) that includes a respective amount of movement (e.g., distance, speed) in a first direction.

In response (806) to detecting the input, and in accordance (808) with a determination that the user interface object includes user-specified content (e.g., information has been entered into a field 610 of the UI object, UI object includes user-selected content (e.g., a song 716 added to a playlist)), the electronic device moves (810) (e.g., translates) the user interface object a first distance selected based on the respective amount of movement of the input in the first direction (e.g., using a resistive rate of movement, less than one-to-one with the movement of the input).

In response (806) to detecting the input, and in accordance (812) with a determination that the user interface object does not include user-specified content (e.g., no info has been entered into any fields 610 of the UI object, UI object does not include any user-selected content (e.g., no songs have been added to a playlist)), the electronic device moves (814) (e.g., translates) the user interface object a second distance selected based on the respective amount of movement of the input in the first direction, wherein the second distance is larger (e.g., greater) than the first distance. Moving the UI object a different distance based on whether the UI object includes user-specified content provides improved visual feedback to a user about the presence or absence of user-specified content for the UI object. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the input (and optionally in accordance with a determination that the input includes more than a threshold amount of movement), the electronic device removes the user interface object from the user interface after moving the user interface object the second distance (e.g., so as to no longer display the user interface object; ceasing to display the user interface object).

In some embodiments, in response to detecting the input and in accordance with the determination that the user interface object includes user-specified content and in accordance with a determination that the respective amount of movement in the first direction is greater than a threshold amount of movement (e.g., the input moves a distance greater than a threshold distance, the input moves with a speed greater than a threshold speed), the electronic device maintains display of at least a portion of the user interface object (e.g., the UI object is not dismissed). In some embodiments, in response to detecting the input and in accordance with the determination that the user interface object includes user-specified content and in accordance with the determination that the user interface object does not include user-specified content and in accordance with a determination that the respective amount of movement in the first direction is greater than the threshold amount of movement, the electronic device ceases to display the user interface object (e.g., the UI object is dismissed). In some embodiments, a user interface object that include user-specified content is maintained on the display after being moved the first distance, while a user interface object that does not include user-specified content is removed from the display, after moving the second distance. Maintaining display of a UI object that includes user-specified content prevents a user from mistakenly dismissing a UI object after the user-specified content has been added, and also provides improved visual feedback to the user that the UI object includes user-specified content. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the input and in accordance with the determination that the respective amount of movement in the first direction is less than the threshold amount of movement (e.g., the input moves a distance greater than a threshold distance, the input moves with a speed greater than a threshold speed), the electronic device maintains display of at least a portion of the user interface object (e.g., the UI object is not dismissed) without regard to whether or not the user interface object includes user-specified content.

In some embodiments, maintaining display of at least a portion of the user interface object includes displaying, via the touch-sensitive display device, a notification (e.g., 618, 718) (e.g., an action sheet with a confirm option (e.g., 620, 720) and a cancel option (e.g., 622, 722)) indicating that a destructive action corresponding to the user-specified content will be performed if the user interface object is removed from the user interface (e.g., performed automatically after a timer expires if not cancelled, performed if a confirmatory input is received, performed if the input is repeated). In some embodiments, the notification is dismissed in response to detecting a subsequent input moving the notification more than a threshold distance.

In some embodiments, after maintaining display of at least a portion of the user interface object, the electronic device detects a sequence of one or more inputs corresponding to a request to remove the user-specified content (e.g., deleting information entered by the user or song added to a playlist). In response to detecting the sequence of one or more inputs, the electronic device removes the user-specified content from the user interface object. After removing the user-specified content, the electronic device detects a second input directed to the user interface object (e.g., a subsequent swipe gesture on the user interface object) that includes the respective amount of movement (e.g., distance, speed) in the first direction. In response to detecting the second input, the electronic device moves (e.g., translates) the user interface object a third distance selected based on the respective amount of movement of the second input in the first direction, wherein the third distance is larger (e.g., greater) than the first distance. Moving the UI object a different distance based on whether the UI object includes user-specified content provides improved visual feedback to a user about the presence or absence of user-specified content for the UI object. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the second input and in accordance with a determination that the respective amount of movement meets a movement threshold, the electronic device ceases to display the user interface object in the user interface (e.g., dismisses the UI object).

In some embodiments, after ceasing to display the user interface object in the user interface, the electronic device displays a second instance of the user interface object (e.g., displays the UI object in response to a request to redisplay the same UI object) and detects a second sequence of one or more inputs corresponding to a request to add user-specified content to the second user interface object. In response to the second sequence of one or more inputs, the electronic device adds user-specified content to the second instance of the user interface object, where the user-specified content is based on the second sequence of one or more inputs. In some embodiments, the electronic device detects a third input directed to the second instance of the user interface object (e.g., a swipe gesture on the second user interface object) that includes user-specified content, the third input including the respective amount of movement (e.g., distance, speed) in the first direction. In response to detecting the third input, the electronic device moves (e.g., translates) the user interface object a fourth distance selected based on the respective amount of movement of the third input in the first direction (e.g., using a resistive rate of movement, less than one-to-one with the input) and maintains display of at least a portion of the second instance of the user interface object (e.g., forgoes ceasing the display of the second instance of the user interface object). Moving the UI object a different distance based on whether the UI object includes user-specified content provides improved visual feedback to a user about the presence or absence of user-specified content for the UI object. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface object is a music playlist. The music playlist includes user-specified content when the music playlist includes one or more songs added by user input (e.g., a custom playlist). The music playlist does not include user-specified content when the music playlist does not include at least one song added by user input (e.g., the playlist is an unmodified playlist (e.g., a system-generated playlist or a downloaded playlist).

In some embodiments, the user interface object (e.g., 624) is part of a sequence of user interface objects related to a common user input task (e.g., a sequence of UI objects collecting health information). The user interface object includes user-specified content when at least one member (e.g., 608) of the sequence of user interface objects related to the common user input task has been modified in response to user input without regard to whether or not the current user interface object (e.g., 624) includes a visual indication of the user-specified content (e.g., after entering information into an earlier UI object and going to the next UI object in the sequence, the next UI object in the sequence resists the dismiss gesture). The user interface object does not include user-specified content when none of the members of the sequence of user interface objects related to the common user input task have been modified in response to user input (e.g., if no information has been entered into any UI objects in the sequence of UI objects, then the UI objects can be dismissed without resistance). Moving the UI object a different distance based on whether any members of a sequence of user interface objects related to a common user input task have been modified in response to user input provides improved visual feedback to a user about the presence or absence of user-specified content in at least one of the members of the sequence of user interface objects. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user-specified content includes information entered by user input (e.g., information entered into a fillable field (e.g., 610); information entered using a keyboard (e.g., physical or virtual)).

In some embodiments, the user interface object (e.g., 608) includes a text field (e.g., 610). The user interface object includes user-specified content when information is entered into the text field by user input (e.g., entered using a keyboard (e.g., physical or virtual)). The user interface object does not include user-specified content when information has not been entered into the text field by user input (e.g., the text field is empty or filled with default text (e.g., system-generated text)).

In some embodiments, the input (e.g., 605, 615, 625, 705, 715) directed to the user interface object is a swipe gesture on the user interface object. In some embodiments, the UI object resists an input (e.g., 635) when the input moves the UI object toward a boundary (e.g., attempting to move UI object upward past an edge of the display device 602).

In some embodiments, the user interface object includes a first portion and a second portion and the input directed to the user interface object is received at the second portion. Prior to detecting the input directed to the user interface object and while displaying the first portion of the user interface object, the electronic device detects a fourth input (e.g., a swipe gesture) directed to the first portion of the user interface object. In response to detecting the fourth input, the electronic device scrolls the user interface object to display the second portion of the user interface object. In some embodiments, the amount of scrolling is determined based on a magnitude (e.g., speed, distance, and/or duration) of movement of the fourth input.

In some embodiments, the user interface object is displayed overlaid on a background (e.g., a desktop or home-screen background, the user interface of an application), wherein the user interface object has a total area less than the area of the background.

In some embodiments, the input directed to the user interface object includes a first portion of movement in the first direction and a second portion of movement in the first direction that occurs after the first portion of movement in the first direction, wherein the first and second portions are equal amounts of movement. In some embodiments, the first distance includes a first partial distance and a second partial distance, where the first partial distance is greater than the second partial distance. In some embodiments, the electronic device moves (e.g., translates) the user interface object the first partial distance based on the first portion of movement (e.g., the UI object initially moves at a first speed relative to the input) and then moves (e.g., translates) the user interface object the second partial distance based on the second portion of movement, where the second partial distance is less than the first partial distance (e.g., the UI object "slows down" as the input continues its movement). Moving the UI object with a different speed as the input moves based on whether the UI object includes user-specified content efficiently indicates to a user the presence or absence of user-specified content for the UI object. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination that the user interface object includes user-specified content, the electronic device displays an affordance (e.g., 612, 712) (e.g., initially displays) (e.g., transitions an already-displayed affordance (e.g., a greyed-out affordance) from an inactive state to an active state) at a first location of the user interface object (e.g., done or next affordance is enabled or displayed after entering information into UI object). In some embodiments, in accordance with the determination that the user interface object does not include user-specified content, the electronic device forgoes display of the affordance at the first location of the user interface object (e.g., "done" or "next" is greyed out or not displayed).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data for a medical identification. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to help first responders access critical medical information. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of a medical identification, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:
1. An electronic device, comprising:
a touch-sensitive display device;
one or more processors; and
memory storing one or more programs configured to be executed by the one or more processors, the one or more programs including instructions for:
displaying, via the touch-sensitive display device, a user interface object including a text field in a user interface;
detecting, via the touch-sensitive display device, an input directed to the user interface object that includes a respective amount of movement in a first direction;
in response to detecting the input:
in accordance with a determination that the user interface object includes information entered into the text field by user input:
moving the user interface object a first distance selected based on the respective amount of movement of the input in the first direction;
in accordance with a determination that the user interface object does not include information entered into the text field by user input:
moving the user interface object a second distance selected based on the respective amount of movement of the input in the first direction, wherein the second distance is larger than the first distance.

2. The electronic device of claim 1, including, in response to detecting the input, removing the user interface object from the user interface after moving the user interface object the second distance.

3. The electronic device of claim 1, wherein the one or more programs further include instructions for:
in response to detecting the input:
in accordance with the determination that the user interface object includes information entered into the text field by user input and in accordance with a determination that the respective amount of movement in the first direction is greater than a threshold amount of movement, maintaining display of at least a portion of the user interface object;
in accordance with the determination that the user interface object does not include information entered into the text field by user input and in accordance with a determination that the respective amount of movement in the first direction is greater than the threshold amount of movement, ceasing to display the user interface object.

4. The electronic device of claim 3, wherein the one or more programs further include instructions for:
in response to detecting the input:
in accordance with the determination that the respective amount of movement in the first direction is less than the threshold amount of movement, maintaining display of at least a portion of the user interface object without regard to whether or not the user interface object includes information entered into the text field by user input.

5. The electronic device of claim 3, wherein maintaining display of at least a portion of the user interface object includes displaying, via the touch-sensitive display device, a notification indicating that a destructive action corresponding to the information entered into the text field by user input will be performed if the user interface object is removed from the user interface.

6. The electronic device of claim 3, wherein the one or more programs further include instructions for:
after maintaining display of at least a portion of the user interface object, detecting a sequence of one or more inputs corresponding to a request to remove the information entered into the text field by user input;
in response to detecting the sequence of one or more inputs, removing the information entered into the text field by user input from the user interface object;
after removing the information entered into the text field by user input, detecting a second input directed to the user interface object that includes the respective amount of movement in the first direction;
in response to detecting the second input:
moving the user interface object a third distance selected based on the respective amount of movement of the second input in the first direction, wherein the third distance is larger than the first distance.

7. The electronic device of claim 6, wherein the one or more programs further include instructions for:
in response to detecting the second input:
in accordance with a determination that the respective amount of movement meets a movement threshold, ceasing to display the user interface object in the user interface.

8. The electronic device of claim 7, wherein the one or more programs further include instructions for:
after ceasing to display the user interface object in the user interface, displaying a second instance of the user interface object;
detecting a second sequence of one or more inputs corresponding to a request to add user-specified content to the second user interface object;
in response to the second sequence of one or more inputs, adding user-specified content to the second instance of the user interface object, wherein the user-specified content is based on the second sequence of one or more inputs; and
detecting a third input directed to the second instance of the user interface object that includes user-specified content, the third input including the respective amount of movement in the first direction;
in response to detecting the third input, moving the user interface object a fourth distance selected based on the respective amount of movement of the third input in the first direction and maintaining display of at least a portion of the second instance of the user interface object.

9. The electronic device of claim 1, wherein the input directed to the user interface object is a swipe gesture on the user interface object.

10. The electronic device of claim 1, wherein the one or more programs further include instructions for:
prior to detecting the input directed to the user interface object that includes the respective amount of movement in the first direction and while displaying a first portion of the user interface object, detecting a fourth input directed to the first portion of the user interface object; and
in response to detecting the fourth input directed to the first portion of the user interface object, scrolling the user interface object to display a second portion of the user interface object, wherein the input directed to the user interface object that includes the respective amount of movement in the first direction is directed to the second portion of the user interface object.

11. The electronic device of claim 1, wherein the user interface object is displayed overlaid on a background, wherein the user interface object has a total area less than the area of the background.

12. The electronic device of claim 1, wherein:
the input directed to the user interface object includes a first portion of movement in the first direction and a second portion of movement in the first direction that occurs after the first portion of movement in the first direction, wherein the first and second portions are equal amounts of movement;
the first distance includes a first partial distance and a second partial distance, wherein the first partial distance is greater than the second partial distance; and
moving the user interface object the first distance includes:
moving the user interface object the first partial distance based on the first portion of movement; and
moving the user interface object the second partial distance based on the second portion of movement; wherein the second partial distance is less than the first partial distance.

13. The electronic device of claim 1, wherein displaying the user interface object includes:
in accordance with the determination that the user interface object includes information entered into the text field by user input, displaying an affordance at a first location of the user interface object; and
in accordance with the determination that the user interface object does not include information entered into the text field by user input, forgoing display of the affordance at the first location of the user interface object.

14. A non-transitory computer-readable storage medium storing one or more programs configured to be executed by one or more processors of an electronic device with a touch-sensitive display device, the one or more programs including instructions for:
displaying, via the touch-sensitive display device, a user interface object including a text field in a user interface;
detecting, via the touch-sensitive display device, an input directed to the user interface object that includes a respective amount of movement in a first direction;
in response to detecting the input:
in accordance with a determination that the user interface object includes information entered into the text field by user input:
moving the user interface object a first distance selected based on the respective amount of movement of the input in the first direction;
in accordance with a determination that the user interface object does not include information entered into the text field by user input:
moving the user interface object a second distance selected based on the respective amount of movement of the input in the first direction, wherein the second distance is larger than the first distance.

15. The non-transitory computer-readable storage medium of claim 14, including, in response to detecting the input, removing the user interface object from the user interface after moving the user interface object the second distance.

16. The non-transitory computer-readable storage medium of claim 14, wherein the one or more programs further include instructions for:
in response to detecting the input:
in accordance with the determination that the user interface object includes information entered into the text field by user input and in accordance with a determination that the respective amount of movement in the first direction is greater than a threshold amount of movement, maintaining display of at least a portion of the user interface object;

in accordance with the determination that the user interface object does not include information entered into the text field by user input and in accordance with a determination that the respective amount of movement in the first direction is greater than the threshold amount of movement, ceasing to display the user interface object.

17. The non-transitory computer-readable storage medium of claim 16, wherein the one or more programs further include instructions for:

in response to detecting the input:

in accordance with the determination that the respective amount of movement in the first direction is less than the threshold amount of movement, maintaining display of at least a portion of the user interface object without regard to whether or not the user interface object includes information entered into the text field by user input.

18. The non-transitory computer-readable storage medium of claim 16, wherein maintaining display of at least a portion of the user interface object includes displaying, via the touch-sensitive display device, a notification indicating that a destructive action corresponding to the information entered into the text field by user input will be performed if the user interface object is removed from the user interface.

19. The non-transitory computer-readable storage medium of claim 16, wherein the one or more programs further include instructions for:

after maintaining display of at least a portion of the user interface object, detecting a sequence of one or more inputs corresponding to a request to remove the information entered into the text field by user input;

in response to detecting the sequence of one or more inputs, removing the information entered into the text field by user input from the user interface object;

after removing the information entered into the text field by user input, detecting a second input directed to the user interface object that includes the respective amount of movement in the first direction;

in response to detecting the second input:

moving the user interface object a third distance selected based on the respective amount of movement of the second input in the first direction, wherein the third distance is larger than the first distance.

20. The non-transitory computer-readable storage medium of claim 19, wherein the one or more programs further include instructions for:

in response to detecting the second input:

in accordance with a determination that the respective amount of movement meets a movement threshold, ceasing to display the user interface object in the user interface.

21. The non-transitory computer-readable storage medium of claim 20, wherein the one or more programs further include instructions for:

after ceasing to display the user interface object in the user interface, displaying a second instance of the user interface object;

detecting a second sequence of one or more inputs corresponding to a request to add user-specified content to the second user interface object;

in response to the second sequence of one or more inputs, adding user-specified content to the second instance of the user interface object, wherein the user-specified content is based on the second sequence of one or more inputs; and detecting a third input directed to the second instance of the user interface object that includes user-specified content, the third input including the respective amount of movement in the first direction;

in response to detecting the third input; moving the user interface object a fourth distance selected based on the respective amount of movement of the third input in the first direction and maintaining display of at least a portion of the second instance of the user interface object.

22. The non-transitory computer-readable storage medium of claim 14, wherein the input directed to the user interface object is a swipe gesture on the user interface object.

23. The non-transitory computer-readable storage medium of claim 14, wherein the one or more programs further include instructions for:

prior to detecting the input directed to the user interface object that includes the respective amount of movement in the first direction and while displaying a first portion of the user interface object, detecting a fourth input directed to the first portion of the user interface object; and in response to detecting the fourth input directed to the first portion of the user interface object, scrolling the user interface object to display a second portion of the user interface object, wherein the input directed to the user interface object that includes the respective amount of movement in the first direction is directed to the second portion of the user interface object.

24. The non-transitory computer-readable storage medium of claim 14, wherein the user interface object is displayed overlaid on a background, wherein the user interface object has a total area less than the area of the background.

25. The non-transitory computer-readable storage medium of claim 14, wherein:

the input directed to the user interface object includes a first portion of movement in the first direction and a second portion of movement in the first direction that occurs after the first portion of movement in the first direction, wherein the first and second portions are equal amounts of movement;

the first distance includes a first partial distance and a second partial distance, wherein the first partial distance is greater than the second partial distance; and moving the user interface object the first distance includes:

moving the user interface object the first partial distance based on the first portion of movement; and moving the user interface object the second partial distance based on the second portion of movement, wherein the second partial distance is less than the first partial distance.

26. The non-transitory computer-readable storage medium of claim 14, wherein displaying the user interface object includes:

in accordance with the determination that the user interface object includes information entered into the text field by user input, displaying an affordance at a first location of the user interface object; and in accordance with the determination that the user interface object does not include information entered into the text field by user input, forgoing display of the affordance at the first location of the user interface object.

27. A method, comprising:
at an electronic device with a touch-sensitive display device:
displaying, via the touch-sensitive display device, a user interface object including a text field in a user interface;
detecting, via the touch-sensitive display device, an input directed to the user interface object that includes a respective amount of movement in a first direction;
in response to detecting the input:
in accordance with a determination that the user interface object includes information entered into the text field by user input:
moving the user interface object a first distance selected based on the respective amount of movement of the input in the first direction;
in accordance with a determination that the user interface object does not include information entered into the text field by user input:
moving the user interface object a second distance selected based on the respective amount of movement of the input in the first direction, wherein the second distance is larger than the first distance.

28. The method of claim 27, including, in response to detecting the input, removing the user interface object from the user interface after moving the user interface object the second distance.

29. The method of claim 27, further comprising:
in response to detecting the input:
in accordance with the determination that the user interface object includes information entered into the text field by user input and in accordance with a determination that the respective amount of movement in the first direction is greater than a threshold amount of movement, maintaining display of at least a portion of the user interface object;
in accordance with the determination that the user interface object does not include information entered into the text field by user input and in accordance with a determination that the respective amount of movement in the first direction is greater than the threshold amount of movement, ceasing to display the user interface object.

30. The method of claim 29, further comprising:
in response to detecting the input:
in accordance with the determination that the respective amount of movement in the first direction is less than the threshold amount of movement, maintaining display of at least a portion of the user interface object without regard to whether or not the user interface object includes information entered into the text field by user input.

31. The method of claim 29, wherein maintaining display of at least a portion of the user interface object includes displaying, via the touch-sensitive display device, a notification indicating that a destructive action corresponding to the information entered into the text field by user input will be performed if the user interface object is removed from the user interface.

32. The method of claim 29, further comprising:
after maintaining display of at least a portion of the user interface object, detecting a sequence of one or more inputs corresponding to a request to remove the information entered into the text field by user input;
in response to detecting the sequence of one or more inputs, removing the information entered into the text field by user input from the user interface object;
after removing the information entered into the text field by user input, detecting a second input directed to the user interface object that includes the respective amount of movement in the first direction;
in response to detecting the second input:
moving the user interface object a third distance selected based on the respective amount of movement of the second input in the first direction, wherein the third distance is larger than the first distance.

33. The method of claim 32, further comprising:
in response to detecting the second input:
in accordance with a determination that the respective amount of movement meets a movement threshold, ceasing to display the user interface object in the user interface.

34. The method of claim 33, further comprising:
after ceasing to display the user interface object in the user interface, displaying a second instance of the user interface object;
detecting a second sequence of one or more inputs corresponding to a request to add user-specified content to the second user interface object;
in response to the second sequence of one or more inputs, adding user-specified content to the second instance of the user interface object, wherein the user-specified content is based on the second sequence of one or more inputs; and
detecting a third input directed to the second instance of the user interface object that includes user-specified content, the third input including the respective amount of movement in the first direction;
in response to detecting the third input, moving the user interface object a fourth distance selected based on the respective amount of movement of the third input in the first direction and maintaining display of at least a portion of the second instance of the user interface object.

35. The method of claim 27, wherein the input directed to the user interface object is a swipe gesture on the user interface object.

36. The method of claim 27, further comprising:
prior to detecting the input directed to the user interface object that includes the respective amount of movement in the first direction and while displaying a first portion of the user interface object, detecting a fourth input directed to the first portion of the user interface object; and
in response to detecting the fourth input directed to the first portion of the user interface object, scrolling the user interface object to display a second portion of the user interface object, wherein the input directed to the user interface object that includes the respective amount of movement in the first direction is directed to the second portion of the user interface object.

37. The method of claim 27, wherein the user interface object is displayed overlaid on a background, wherein the user interface object has a total area less than the area of the background.

38. The method of claim 27, wherein:
the input directed to the user interface object includes a first portion of movement in the first direction and a second portion of movement in the first direction that occurs after the first portion of movement in the first direction, wherein the first and second portions are equal amounts of movement;

the first distance includes a first partial distance and a second partial distance, wherein the first partial distance is greater than the second partial distance; and moving the user interface object the first distance includes:

moving the user interface object the first partial distance based on the first portion of movement; and moving the user interface object the second partial distance based on the second portion of movement, wherein the second partial distance is less than the first partial distance.

39. The method of claim 27, wherein displaying the user interface object includes:

in accordance with the determination that the user interface object includes information entered into the text field by user input, displaying an affordance at a first location of the user interface object; and in accordance with the determination that the user interface object does not include information entered into the text field by user input, forgoing display of the affordance at the first location of the user interface object.

\* \* \* \* \*

UNITED STATES PATENT AND TRADEMARK OFFICE
CERTIFICATE OF CORRECTION

PATENT NO. : 11,016,643 B2
APPLICATION NO. : 16/688766
DATED : May 25, 2021
INVENTOR(S) : Cas Lemmens et al.

It is certified that error appears in the above-identified patent and that said Letters Patent is hereby corrected as shown below:

In the Claims

Column 44, Line 16, Claim 12, delete "movement;" and insert -- movement, --, therefor.

Column 46, Line 8, Claim 21, delete "input;" and insert -- input, --, therefor.

Signed and Sealed this
Twenty-fourth Day of May, 2022

Katherine Kelly Vidal
*Director of the United States Patent and Trademark Office*